United States Patent [19]

Doane

[11] Patent Number: 5,267,638
[45] Date of Patent: Dec. 7, 1993

[54] DUAL-SERVO CONTROL FOR CONVEYOR INDUCTION SYSTEMS

[75] Inventor: Martin R. Doane, Ada, Mich.

[73] Assignee: Rapistan Demag Corporation, Grand Rapids, Mich.

[21] Appl. No.: 36,226

[22] Filed: Mar. 24, 1993

Related U.S. Application Data

[63] Continuation of Ser. No. 743,506, Aug. 9, 1991, abandoned, which is a continuation-in-part of Ser. No. 597,103, Oct. 12, 1990, Pat. No. 5,038,911, which is a continuation of Ser. No. 352,002, May 15, 1989, abandoned, which is a continuation-in-part of Ser. No. 311,826, Feb. 16, 1989, abandoned.

[51] Int. Cl.$^5$ .................................... B65G 47/46
[52] U.S. Cl. .................................... 198/357; 198/444; 198/460; 198/461
[58] Field of Search ................ 198/357, 444, 460, 461

[56] References Cited

U.S. PATENT DOCUMENTS

| | | |
|---|---|---|
| 2,304,447 | 12/1942 | Feusier . |
| 2,978,092 | 4/1961 | Phillips et al. . |
| 3,063,544 | 11/1962 | Yen . |
| 3,075,630 | 1/1963 | Fisk . |
| 3,096,871 | 7/1963 | Anderson . |
| 3,223,225 | 12/1965 | Clark et al. . |
| 3,242,342 | 3/1966 | Gabar . |
| 3,250,375 | 5/1966 | Bonthuis et al. . |
| 3,251,452 | 5/1966 | Conway et al. . |
| 3,323,634 | 6/1967 | Arvidson et al. . |
| 3,458,026 | 7/1969 | Lauzon et al. . |
| 3,485,339 | 12/1969 | Miller et al. . |
| 3,512,624 | 5/1970 | Crane . |
| 3,515,254 | 6/1970 | Gary . |
| 3,523,618 | 8/1970 | Nielsen . |
| 3,747,781 | 7/1973 | Daigle et al. . |
| 3,771,783 | 11/1973 | McInerny . |
| 3,774,748 | 11/1973 | Dederer et al. . |
| 3,817,368 | 6/1974 | Wentz et al. . |
| 3,822,009 | 7/1974 | Richards . |
| 3,827,545 | 8/1974 | Buyhayar . |
| 3,905,491 | 9/1975 | Harrison . |
| 4,044,897 | 8/1977 | Maxted . |
| 4,077,620 | 3/1978 | Frank et al. . |
| 4,113,244 | 9/1978 | Ruenzi . |
| 4,140,310 | 2/1979 | Schroter . |
| 4,158,456 | 6/1979 | Holland-Letz . |
| 4,318,540 | 3/1982 | Paananen et al. . |
| 4,331,328 | 5/1982 | Fasig . |
| 4,360,098 | 11/1982 | Nordstrom . |
| 4,429,781 | 2/1984 | Holtzhauser . |
| 4,451,027 | 5/1984 | Alper . |

FOREIGN PATENT DOCUMENTS

| | | |
|---|---|---|
| 0130810 | 1/1985 | European Pat. Off. . |
| 0274229 | 7/1988 | European Pat. Off. . |
| 0310411 | 4/1989 | European Pat. Off. . |
| 2336984 | 9/1976 | France . |
| 2581215 | 4/1985 | France . |
| 53-13386 | 1/1978 | Japan . |
| 59-18283 | 4/1984 | Japan . |
| 1587715 | 4/1981 | United Kingdom . |
| 2123375 | 2/1984 | United Kingdom . |
| 2182299A | 5/1987 | United Kingdom . |

*Primary Examiner*—D. Glenn Dayoan
*Attorney, Agent, or Firm*—Price, Heneveld, Cooper, DeWitt & Litton

[57] ABSTRACT

A conveyor system including an induction subsystem for producing a desired spacing between packages as they are discharged from a single induction line or merged from multiple lines. Each induction line includes a conveyor and a speed controller for controlling the running speed of the conveyor in a manner that discharges a package as close as possible to a time necessary to provide a desired gap with a previously-discharged package. Each induction line is operated by two servo-controlled motors, with the speed of the downstream motor being controlled in a manner that will provide desired spacing between inducted packages and with the speed of the upstream motor being controlled as a selectable ratio to the speed of the downstream motor. This provides an initial controllable gap between packages to reduce the range of gaps experienced by the induction control. In another embodiment, a sortation subsystem is operated at a higher line speed than the induction subsystem from which it receives packages. The induction subsystem establishes gaps between packages taking into account the increase in line speed and package lengths so that the gaps are of desired length at the sortation subsystem.

22 Claims, 12 Drawing Sheets

DUAL-SERVO CONTROL FOR CONVEYOR INDUCTION SYSTEMS

CROSS-REFERENCE TO RELATED APPLICATION

This is a continuation of copending application Ser. No. 07/743,506 filed on Aug. 9, 1991, now abandoned, which is a continuation-in-part of application Ser. No. 07/597,103, filed Oct. 12, 1990, now U.S. Pat. No. 5,038,911, which is a continuation of patent application Ser. No. 07/352,002, filed May 15, 1989, now abandoned, which is a continuation-in-part of application Ser. No. 07/311,826, filed Feb. 16, 1989, now abandoned.

BACKGROUND OF THE INVENTION

This invention relates to conveyor systems and in particular to induction subsystems for providing controlled separation or gaps between packages being delivered single file to a sortation subsystem for sorting of the packages.

In a warehouse, such as a transshipment distribution warehouse, packages are unloaded from trucks or rail cars bringing product from various sources and reorganized, for example, according to product groupings, for storage of like products in common areas of a warehouse, or according to a particular ultimate destination for reloading onto a trailer or the like. A conveyor system for accommodating this activity conventionally includes many infeed spurs which converge and merge the packages into a single-file of product. The single-filed product is then sorted package by package onto sortation take-away spur lines by a sortation subsystem.

In order to sort packages on the sortation subsystem, it is necessary that the packages be separated by a gap of sufficient length to allow a mechanical sortation mechanism to remove individual packages from the sortation conveyor at the desired point by displacement of the moving package laterally from the sortation line, as the package passes the appropriate take-away line. While a suitable spacing, or gap, is required between packages, any spacing larger than that required to operate the sortation subsystem decreases the capacity of the conveyor system to convey packages.

One technique for establishing gaps between packages is to discharge the stream of packages from an accumulating conveyor onto a series of belts of increasing speed. As the package discharges from one belt to the next, it is accelerated and spaced from the subsequent package. The difficulty with such a system is that the gap is proportional to the length of the package. The result is that, if system parameters are selected to properly gap the smallest packages, wasteful large gaps will occur between longer packages.

Another difficulty that must be addressed in such a system is the merging of packages into a single file for sortation. Because warehouse floor space is usually at a premium, it is disadvantageous to provide an accumulation conveyor between a completely merged line of packages and the sortation subsystem because the required length of the accumulation conveyor would be great. Accordingly, it may be desirable to separate the infeed lines into two or more feed lines each having a short accumulation conveyor and provide the final package merge immediately upstream the sortation subsystem. Multiple accumulation conveyors feeding the sortation subsystem can run at slower speeds than would be required to deliver the same volume of packages from a single accumulation line. This also increases the life expectancy of the conveyor and reduces noise.

SUMMARY OF THE INVENTION

The present invention provides a controlled spacing induction subsystem which produces a greater throughput, or flow of packages through the system, while minimizing system down time and damage to packages. The present invention may further provide for combining the functions of final merging of two or more feed lines with that of spacing of packages in an individual operation in which packages are inducted from a plurality of feed lines in a manner that desirable spacing is provided between the packages regardless of package size.

The invention may be embodied in a conveyor system having a sortation subsystem adapted to sorting packages onto selected spurs, an induction subsystem adapted to discharging packages to the sortation subsystem with desired spacing between packages and a control. According to one aspect of the invention, the induction subsystems include at least one induct control conveyor and an initial gap control conveyor located upstream of the induct control conveyor. The control includes means for controlling the speed of the induct control conveyor to create the desired spacing between packages on the sortation subsystem and means for controlling the speed of the initial gap control conveyor in a manner that will provide controlled spacing between packages on the induct control conveyor.

The invention may advantageously be implemented by controlling the speed of the initial gap control conveyor as a function of the speed of the induct control conveyor and a variable speed ratio selected to provide the controlled spacing, or initial gap, between packages.

In an illustrated embodiment, a first servo drive is provided for controlling the speed of the induct control conveyor and a second servo drive is provided for controlling the speed of the initial gap control conveyor. The control includes a first selecting means for selecting the speed of the induct control conveyor to create the desired spacing between packages received on the sortation subsystem and a second selecting means for selecting the ratio of speeds between the two conveyors required to perform the initial gapping function. The control establishes the speed of the initial gap control conveyor as a function of the speed selected by the first selecting means for the induct control conveyor and the ratio selected by the second selecting means. In this manner, the relationship between the induct control conveyor and the initial gap control conveyor is that of master/servant with the relationship being variable and selectable by the control means in a unique manner. The desired gaps between packages discharged to the sortation subsystem are defined between trailing edges of leading packages and leading edges of following packages. The initial gap between packages on each induct control conveyor is established, according to another aspect of the invention, with respect to the longitudinal centerlines of leading and following packages. Preferably, a constant center-to-center initial gap is provided between packages. Where packages are merged from plural induct control conveyors, the initial gap is selected as a function of the time it takes an induct control conveyor to decelerate to its slowest speed. This initial gap is sufficient to provide complete control over any package on the conveyor.

According to another aspect of the invention, the induction subsystem is operated at a first line speed and the sortation subsystem is operated at a second line speed that is different from the first line speed. Control means are provided for controlling the induction subsystem in a manner that will cause desired gaps between packages after the packages are received by the sortation subsystem. This aspect of the invention advantageously allows the induction subsystem to operate at a slower, and hence, more accurate speed, while creating desired gaps between the packages at the location where such gaps are necessary. This is at the sortation subsystem wherein sufficient gaps are necessary in order to facilitate sortation of the packages but excessive gaps are undesirable because of the resulting reduction in through-put of the system. This aspect of the invention may be embodied in a conveyor system in which the control actuates speed control means as a function of the ratio of the discharge speed of the induction subsystem to the speed of the sortation subsystem, as well as the desired gaps between the packages and the length of each package.

These and other related objects, advantages and features of this invention will become apparent upon review of the following specification in conjunction with the drawings.

DESCRIPTION OF THE PREFERRED EMBODIMENT

Figure 1:
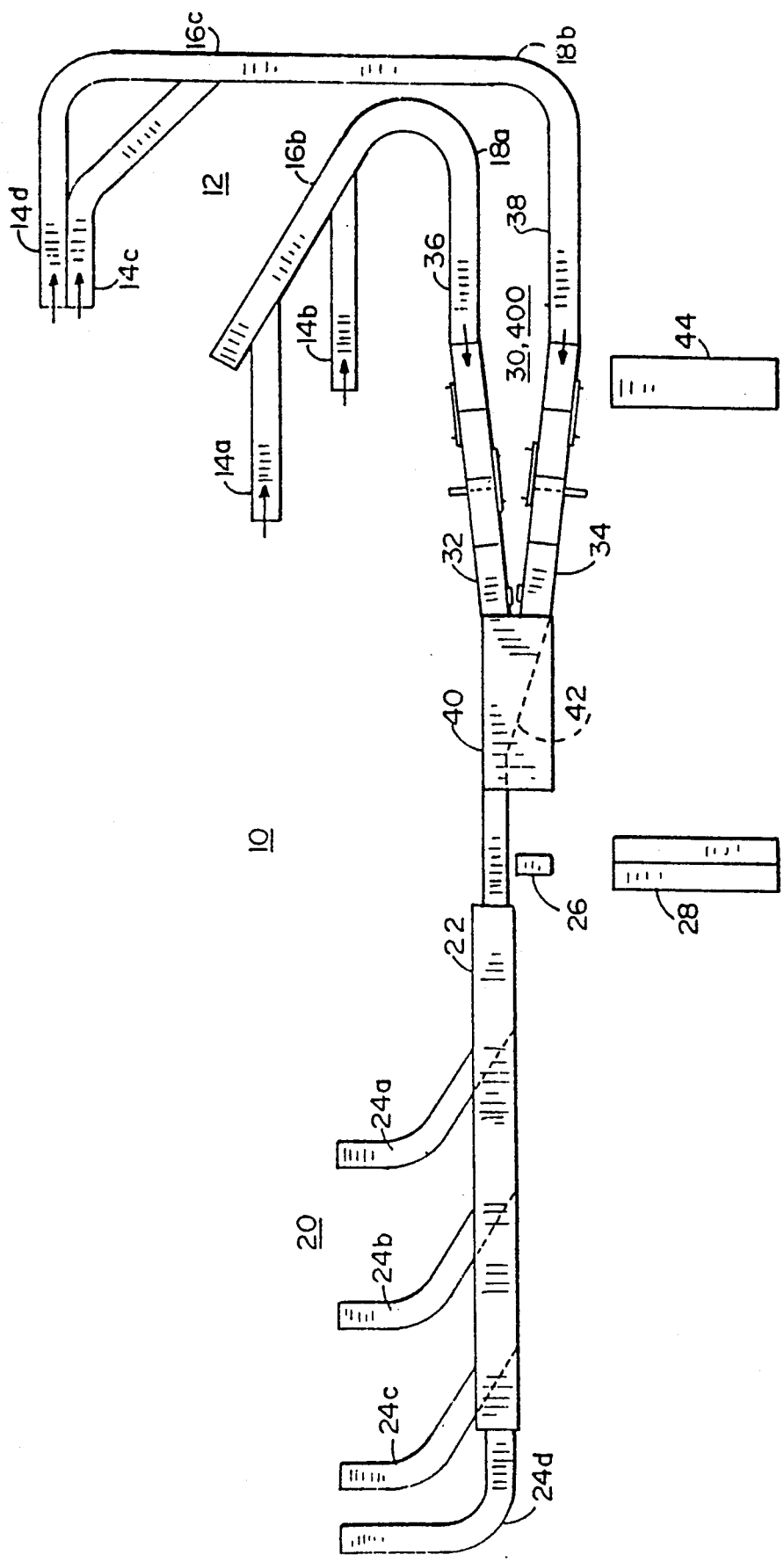
FIG. 1 is a plan view of a conveyor system embodying the invention.

Referring now specifically to the drawings, and the illustrated embodiments depicted therein, a conveyor system generally illustrated at 10 includes an infeeding subsystem 12 having a plurality of infeed conveyor lines 14a through 14d. Infeed line 14a merges with another infeed line 14b at junction 16b to form a combined feed line 18a. Infeed lines 14c and 14d combine at junction 16c to form a combined feed line 18b. Conveyor system 10 further includes a sortation subsystem 20 including a sortation conveyor 22 and a plurality of take-away lines 24a through 24d. Sortation subsystem 20 may further include a laser scanner 26 for encoding bar-codes from packages entering conveyor 22 into a sortation controller 28, which compares each product bar-code with a table stored in memory to determine the appropriate take-away line 24a through 24d to dispatch the package to and to actuate a take-away device (not shown) at the required time to laterally displace the package from the sortation conveyor 22 to the appropriate take-away line 24a through 24d.

Conveyor system 10 further includes a multiple line induction subsystem 30 which, in the illustrated embodiment, includes a first induction line 32 and a second induction line 34. Although the invention is illustrated in an induction subsystem having two induction lines, it is capable of implementation in a subsystem having only one line or more than two induction lines. Particular advantages of the invention may be realized in a subsystem having only one induction line and the number of plural induction lines to which it may apply is theoretically unlimited. Feed line 18a is joined with first induction line 32 by an accumulator 36 which accumulates product awaiting entry to first induction line 32. An accumulator 38 is positioned between infeed line 18b and second induction line 34. An alignment conveyor 40 receives packages discharged from induction lines 32 and 34 and provides a guide bar 42 for laterally shifting packages discharged from line 34 into a single file with packages discharged from line 32. Packages are discharged from alignment conveyor 40 onto sortation conveyor 22. Induction subsystem 30 further includes a control 44 which receives inputs from input devices associated with induction lines 32 and 34 and produces outputs for controlling the speeds of lines 32 and 34. Control 44 may additionally interface with sortation controller 28 and other control portions of the conveyor system 10.

Figure 2:
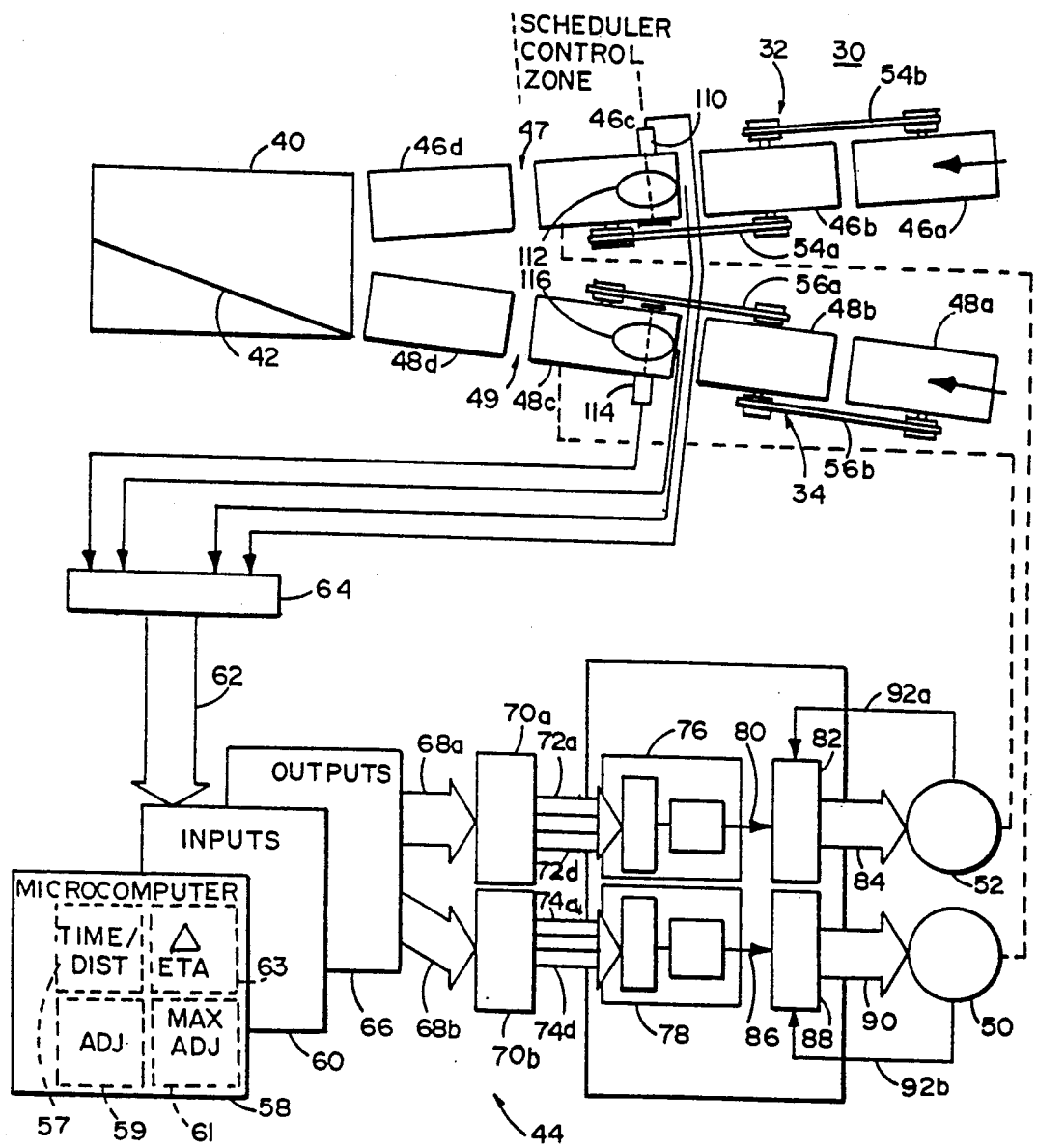
FIG. 2 is a plan view of a multiple line induction subsystem embodying the invention.

Each induction line of multiple line induction subsystem 30 includes four belt conveyors designated 46a through 46d for first induction line 32 and 48a through 48d for induction line 34 (FIG. 2). Belt conveyor 46c is a metering conveyor and is driven from an AC servo motor and reducer assembly 50 having a holding brake (not shown). Belt conveyor 48c is also a metering conveyor and is independently driven by AC servo motor and reducer assembly 52. Belt conveyor 46b is driven by speed reducer 54a mechanically coupled with belt 46c and belt 46a is driven by speed reducer 54b driven from conveyor 46b. Speed reducers 54a and 54b are each configured to reduce the speed of the driven conveyor to 70% of the driving conveyor. In this manner, belt conveyor 46b is driven at 70% of the speed of conveyor 46c and conveyor 46a is driven at 70% of the speed of conveyor 46b. Likewise, belt conveyor 48b is driven at 70% of the speed of belt conveyor 48c by speed reducer 56a and belt conveyor 48a is driven at 70% of the speed of belt conveyor 48b by speed reducer 56b.

Belt conveyors 46d and 48d receive packages from conveyors 46c and 48c respectively and are operated at fixed speeds identical with alignment conveyor 40 independently of the speeds of conveyors 46a-46c and 48a-48c. In the illustrated embodiment, conveyors 40, 46d and 48d are driven at 350 feet per minute, which is the same speed as sortation conveyor 22, and metering conveyors 46c and 48c are independently operable at three discrete running speeds: 0 fpm, 350 fpm and 600 fpm. Although conveyors 46c and 48c are operable at three discrete running speeds, servo motors 50 and 52 are capable of infinitely variable speed adjustment over a wide range of speeds and are controlled in a manner that provides constant acceleration (and deceleration) between discrete running speed levels. The acceleration level is preselected to avoid overturning a package and avoiding slippage between the packages and the belts.

Control 44 includes a microcomputer 58 having an input circuit board 60 which receives parallel inputs 62 from an input module 64. Microcomputer 58 additionally includes an output circuit board 66 which provides parallel outputs 68a to an output module 70a and parallel outputs 68b to an output module 70b. Input board 60 is a 48 channel parallel input card having a standard bus interface with microcomputer 58. Output board 66 is a 48 channel parallel output card having a standard bus interfaced with microcomputer 58. Output module 70a provides output signals on four parallel lines 72a through 72d that are presented to a servo interface circuit 76 as selection lines for one of four running speeds for servo motor 52, although only three running speeds are used in the illustrated embodiment. Output module 70b provides output signals on lines 74a through 74d that are presented to a servo interface circuit 78 as running speed selection lines for servo motor 50. Microcomputer 58, in the illustrated embodiment, is a commercially available microcomputer sold by Cubit and based on a 16 bit Intel 80186 microprocessor. Input module 64 and output modules 70a and 70b may be any suitable commercially available interface modules.

Servo interface circuit 76 produces, in response to the levels of lines 72a-72d, a DC analog voltage output on line 80 which is provided as a velocity command to a servo motor controller 82. Controller 82, in turn, produces multi-phase AC outputs 84 to control the direction of rotation and velocity of servo motor 52, although only one direction of rotation is used in the illustrated embodiment. Likewise, servo interface circuit 78 produces, in response to the levels of lines 74a-74d, an analog DC voltage output on a line 86 which is provided as a velocity command to a servo motor controller 88, which produces multi-phase AC outputs 90 for inputs to servo motor 50. Feedback lines 92a, from servo motor 52 to controller 82, and 92b, from servo motor 50 to controller 88, provide velocity feedback signals from velocity transducers (not shown) to the associated controller to effectuate velocity control of the motors. In the illustrated embodiment, the servo motor controllers and servo motors are commercially available and sold in a prepackaged system by Allen Bradley, under Model No. 1391-AA45.

Figure 3:
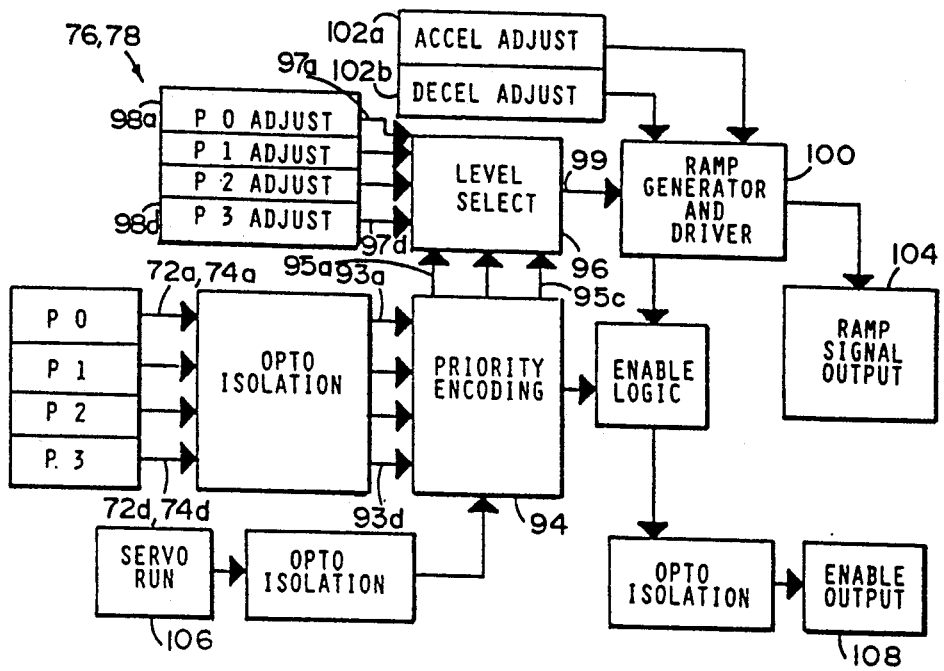
FIG. 3 is a circuit diagram in block diagram form of an interface circuit between the microcomputer and servo motor control for the subsystem in FIG. 2.
Figure 7:
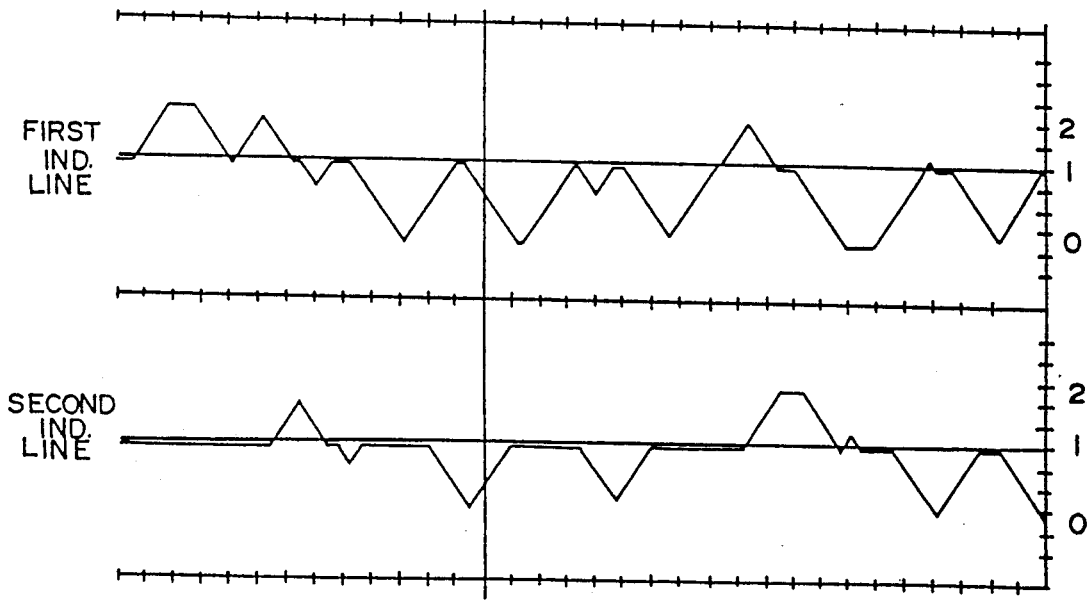
FIG. 7 is a diagram of the conveyor speed for a two-line induction subsystem.

A block diagram for servo interface circuits 76 and 78 is illustrated in FIG. 3. The signals on speed-select lines 72a through 72d or 74a through 74d are optically isolated and provided on lines 93a-93d to a priority encoding circuit 94. Priority encoding circuit 94 compares the current speed-select inputs with the immediately previous speed-select inputs and selects a new running speed on a priority basis, with higher speeds having priority. Priority encoding circuit 94 interprets the condition of an absence of input signals on lines 93a-93d as a zero speed, or brake selection command. Outputs from priority encoding circuit 94 are provided on lines 95a-95c to a level-select circuit 96 which also receives analog voltage signals on lines 97a-97d from manually-settable voltage setting devices 98a through 98d, to establish the values of the four selectable running speed levels. Output 99 from level-select circuit 96 is the voltage level set by the adjusting means 98a-98d which corresponds to the speed selected by encoding circuit 94 and provides an input signal to a ramp generator and driver circuit 100.

Ramp generator and driver circuit 100 additionally receive manually-settable ramp adjustment inputs from devices 102a and 102b. Ramp adjustment devices 102a and 102b establish the values of the constant slopes of the analog voltage ramps between speed changes, which, in turn, provide constant positive acceleration to increasing discrete speed levels and negative acceleration to decreasing discrete speed levels. The settings of devices 102a and 102b thus establish the acceleration forces exerted on the packages. In the preferred embodiment, adjustment devices 102a and 102b are set to produce a maximum acceleration/deceleration force on the packages that will not topple packages on the conveyor. Ramp generator and driver circuit 100 produce an analog speed signal output 104 which is provided on line 80 or 86 to the respective servo motor controller. Servo interface circuit 76, 78 additionally receives a servo run interlock input 106 from other portions of the conveyor system to actuate the servo interface circuit. An enable logic circuit 107 responds to a command from priority encoding circuit 94 and produces an enable output 108 to release the brake (not shown) for the respective servo motor 50, 52 when a nonzero speed is selected. When, however, a zero speed is being requested, priority encoding circuit 94 causes enable logic circuit 107 to remove the enable output 108 in order to apply the brakes to the particular induction line provided that a command from ramp generator and driver circuit 100 indicates that the drive signal produced on output 104 is very close to zero speed. This causes the brakes to be applied when there is a significant interruption in supply of packages to a particular induction line to prevent belt creep.

Input module 64 receives two inputs from each induction line 32 and 34. A first input for line 32 is received from a photo eye 110 projecting a beam which is blocked by the presence of a package in its path on metering conveyor 46c. A second input for line 32 is provided by a position encoder 112 which outputs a pulse to input module 64 having a signal transition every ¼" travel of the belt of metering conveyor 46c. Likewise, a photo eye 114 is associated with line 34 and projecting a beam blocked by a package in its path on metering conveyor 48c. A second input for line 34 is provided by a position encoder 116 which outputs a pulse to input module 64 for every ¼" travel of the belt of conveyor 48c. Although the speed of conveyor belts 46a, 46b and 46c are fixedly interrelated, the speeds of conveyors 48a, 48b and 48c are fixedly interrelated and conveyors 46d, 48d and 40 are operated at a common fixed speed, the relative speeds between conveyors 46a through 46c, conveyors 48a through 48c and conveyors 46d, 48d and 40 are continually changing in a manner that will now be set forth.

A) Single Induction Line Operation

Packages entering first induction line 32 from accumulator 36 are accelerated from belts 46a to 46b and from belts 46b to 46c to establish a preliminary gap, or spacing, between the packages. As a package traverses metering conveyor 46c, its leading edge will initiate blockage of the beam of photo eye 110 which will initiate execution of a control routine in microcomputer 58. The position of the package will be tracked in half-inch increments by signals provided from encoder 112. As the package continues to traverse conveyor 46c, its trailing edge will allow reestablishment of the beam of photo eye 110, which will again initiate execution of a control routine in microcomputer 58. As the package continues to traverse belt 46c, its longitudinal center will eventually reach the discharge interface 47 between belts 46c and 46d at which point the package will be half on conveyor 46c and half on conveyor 46d. Once a package is more than half on conveyor 46d, its rate of travel is presumed to be controlled by the speed of the belt of conveyor 46d. At that point in time, the package is said to be released from induction line 32 and another execution of a control routine is initiated in microcomputer 58. The system does not, however, require a package sensor positioned at the discharge interface 47. The sequence of events that occurs for packages traversing first induction line 32 from accumulator 36 occur in an essentially identical fashion for packages traversing second induction line 34 from accumulator 38.

Figure 6:
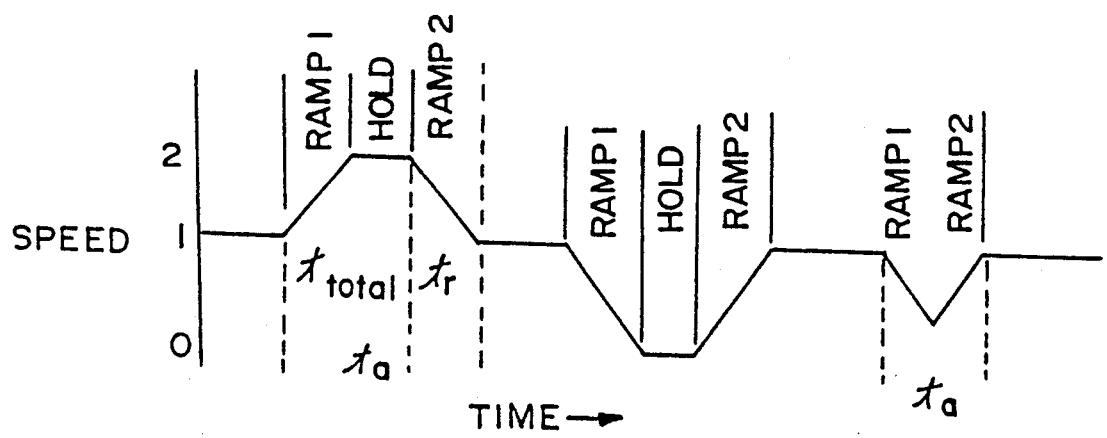
FIG. 6 is a diagram of the conveyor speed for a one-line induction subsystem.

Operation of each induction line may be understood by reference to FIG. 6 in which a chart of line speed versus time is illustrated for induction line 32 or 34 or for a single induction line system. The abscissa represents time and the ordinance represents line speed with 0 indicating a stopped condition, 1 indicating nominal running speed and 2 representing a second selectable running speed that is higher than speed 1. The flat portions of each curve represent constant conveyor speeds and the sloping portions represent acceleration (sloping upwardly from left-to-right) and deceleration (sloping downwardly from left-to-right). When it is determined, in a manner that will be set forth in more detail below, that the gap length between a package on the metering conveyor and prior package is greater than or less than a desired gap length, the metering conveyor is either accelerated toward higher speed 2 to decrease an excessive gap or decelerated toward lower speed 0 to increase a deficient gap.

Each adjustment event includes an acceleration or deceleration of constant magnitude, defined as ramp 1, and an acceleration or deceleration of constant magnitude and polarity opposite to that of ramp 1, defined as ramp 2. The slopes of ramp 1 and ramp 2 are established by the settings of devices 102a and 102b and represent the value of the acceleration and deceleration of the metering conveyor. If the duration of the adjustment period is long enough, then the metering conveyor must be decelerated from nominal speed 1 to speed 0 or accelerated to speed 2 and held at that speed for a "hold" period, prior to returning to nominal speed. This results from the speed of the metering conveyor being limited at the upper end by the value of discrete speed 2 and at the lower end by speed 0, which is a stopped conveyor.

If the duration of the adjustment period is relatively short, then the metering conveyor is decelerated from nominal speed toward speed 0 or accelerated toward speed 2 but doesn't reach the higher, or lower, discrete speed. Rather, after the adjustment period (ramp 1), the metering conveyor is returned to nominal speed (ramp 2) without a "hold" period.

When the longitudinal center of a package reaches the discharge interface, where it is released from its metering conveyor to the receiving conveyor, the control routine determines a value in real time at which the leading edge of a subsequent package must arrive at its discharge interface in order to establish a desired gap or spacing with the trailing edge of the discharged package. This parameter is labeled the desired time of arrival (DESIRED ETA) of the subsequent package. The control routine determines the estimated time of arrival of the subsequent package (CURRENT ETA) from the profile of the conveyor speed from the time that the leading edge of the package entered the control zone in a manner that will be discussed in more detail below. The difference between the CURRENT ETA and the DESIRED ETA (ETA DIFFERENCE) is applied by the control routine to one of two tables 59 (ADJ table), the particular table being determined by whether ETA DIFFERENCE is positive (requiring deceleration) or negative (requiring acceleration). A value of time, in milliseconds (SUGGESTED ADJ), is obtained from the appropriate ADJ table 59, corresponding to the combined length of ramp 1 and hold, if any, that will bring CURRENT ETA to DESIRED ETA.

Although the value of SUGGESTED ADJ will essentially eliminate any difference between DESIRED ETA and CURRENT ETA, the package may be too close to the discharge interface to allow the metering conveyor to carry out the speed adjustment and return to nominal speed before the longitudinal center of the package arrives at the discharge interface. The metering conveyor must return to nominal speed, which is the same speed as the receiving conveyor, to provide a smooth discharge of the package. To assure the return to normal speed, the control routine applies the POSITION parameter, which indicates the distance of the package's longitudinal centerline from the discharge interface and is kept current from the conveyor position encoder, to a lookup table 61 to select a value of the maximum speed adjustment (MAX ADJ) that may be carried out while still returning the speed of the metering conveyor to return to nominal speed. If the value of SUGGESTED ADJ is greater than the value of MAX ADJ, then it is reduced to not exceed MAX ADJ and is designated CURRENT ADJ. The induction line may have more than one package in the control zone on the metering conveyor. Therefore, the adjustment to the speed of the metering conveyor (TOTAL ADJUST) is based on the value of CURRENT ADJ for the package closest to discharge.

Once the TOTAL ADJUST is determined for an induction line, microcomputer 58 provides commands on lines 72a-72d or 74a-74d, for the duration of ramp 1 and hold periods, requesting speed 0 or 2 and, for the duration of ramp 2 period and beyond, requesting a return to nominal speed. The associated servo interface circuit 76, 78 responds to the speed commands on lines 72a-72d or 74a-74d by linearly ramping output 104 upward or downward toward the level set by the corresponding speed adjust device 98a-98d at a rate set by the corresponding acceleration adjust device 102a, 102b. Once output 104 reaches the new level corresponding to conveyor speed 0 or 2, it is capped at this level during the hold period by ramp generator and driver circuit 100. Output 104 is linearly ramped to a value representing nominal speed 1 during ramp 2 period at a rate set by the corresponding acceleration adjust device 102a, 102b.

From the moment that a package enters the control zone of an induction line, any speed adjustments to prior packages that are simultaneously in the control zone will affect the ETA of that package. To compensate for this, a lookup table 63 provides a value used by the control routine to adjust the ETA parameter (Δ ETA) of a package by the amount of adjustment that occurs to a package from prior packages in the control zone. An additional lookup table 57 provides conversions between time durations and the linear distance (TIME/DIST.) traveled by the metering conveyor at nominal speed.

B) Multiple Induction Line Operation

Beginning when a package enters metering conveyor 46c from conveyor 46b and blocks the beam of photo eye 110, and likewise, when a package enters metering conveyor 48c and blocks the beam of photo eye 114, various parameters relating to the package are monitored and updated in microcomputer 58. During this period, each package is under the precise control of a package scheduler program 120 which, through a series of control routines, manipulates on a real-time basis the instantaneous speeds of servo motors 50 and 52 to cause packages to be discharged from metering conveyors 46c and 48c to receiving conveyors 46d and 48d in a manner that will cause the packages to have a desired gap or spacing therebetween as the packages traverse belt 40 toward the sortation system. When the package is discharged to receiving conveyor 46d or 48d, the parameters relating to the package are cleared from the microcomputer. While, in the illustrated embodiment, the desired package spacing is a predetermined fixed spacing, in certain applications it may be desired to provide a desired spacing that relates to another parameter, such as the width of the package.

It is important to an understanding of the invention to recognize that more than one package may be within the scheduler control zone under the control of microcomputer 58 for each induction line at any one time and that the discharging of packages from first and second induction lines 32 and 34 is not necessarily, or even typically, in an alternating sequence. Rather, in essence, the control routine 120, on an event driven basis, repetitively determines the estimated time of arrival (ETA) of the leading edge of each package within the control zone, the necessary adjustment to the speed of each servo motor 50, 52 to cause each package to arrive at the point of discharge 47, 49 at a desired time to provide desired spacing and which line is capable of causing its respective packages to arrive closest to the desired time, taking into account restraints on the amount of adjustment that may be made in the ETA of each package. When the selection has been made of the package to be discharged next, the desired time for arrival of the remaining packages in the control zone are adjusted accordingly and physical adjustments in the speeds of motors 50 and 52 are effected.

It bears repeating that the control routine is event-driven. Each time that a package blocks the photo eye, unblocks the photo eye, is discharged from the control zone, and each time a speed adjustment is effected, the control routine 120 is executed. Therefore, the decision of which package from which line is the priority package and what speed adjustment to make on each induction line is reevaluated repetitively. It has been found that by so doing, the illustrated conveyor system operates at a much higher rate of package through-put.

For each package that enters the scheduler control zone by arriving at photo eye 110 or 114 a memory file in microcomputer 58 is opened for the following parameters of the package:

Package Length
Current Estimated Time of Arrival (CURRENT ETA)
Suggested Estimated Time of Arrival (SUGGESTED ETA)
Current Adjustment Specified for the Package (CURRENT ADJ)
New Adjustment Specified for the Package (NEW ADJ)
Desired Gap
Position of Package on Conveyor (POSITION)

As previously set forth, more than one package may be within the scheduler control zone for each induction line and the memory space for each package is freed as the package is discharged onto the respective receiving conveyor The most downstream package for each induction line is considered the "top of the line" package for that line.

Figure 4A:
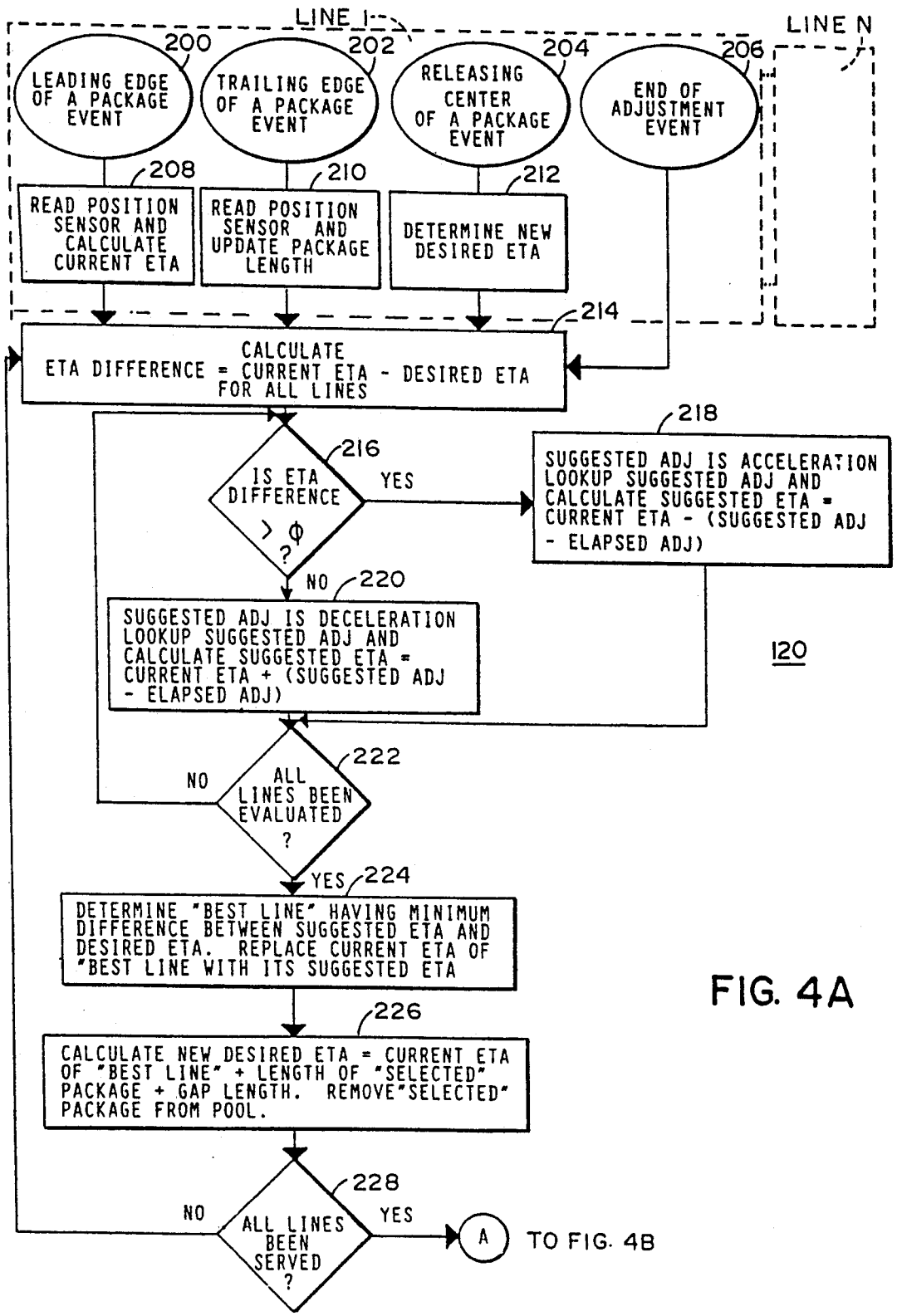
FIGS. 4a and 4b are a logic flow diagram of the program used to control the subsystem in FIG. 2.
Figure 4B:
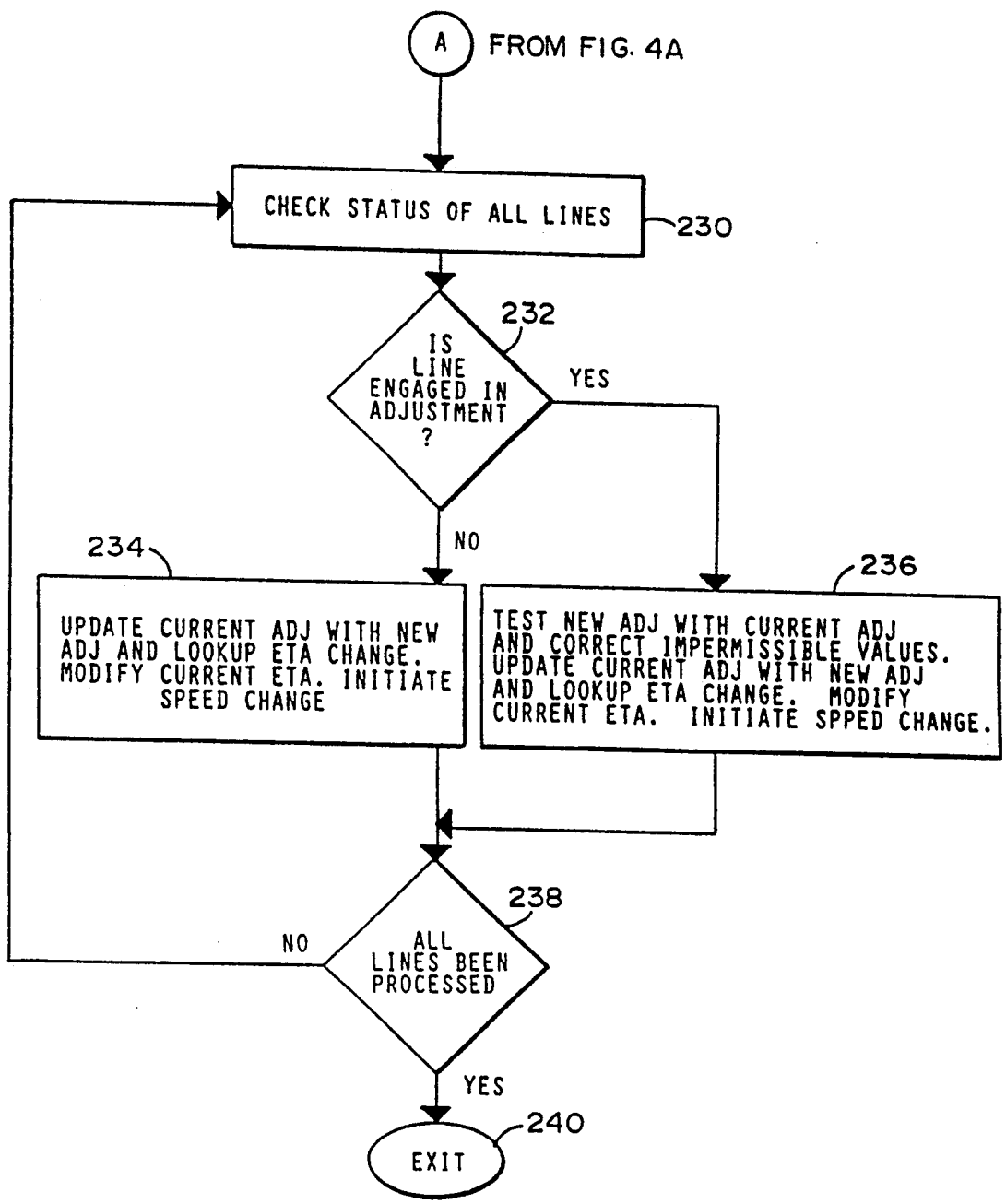

A discussion of the package scheduler software routine 120 is made in reference to FIGS. 4a and 4b. Software routine 120 is event driven, which means that the software routine illustrated in FIGS. 4a and 4b is executed in response to an occurrence of an event in real time on induction line 32 or 34 or, if n induction lines are provided, then on any of lines 1 through n. Routine 120 is executed, with respect to the first induction line (line 1) at 200 in response to the breaking of the light beam from photo eye 110, at 202 in response to the reestablishment of the light beam of photo eye 110 at the trailing edge of a package, at 204 upon the release of a package to receiving conveyor 46d and at 206 upon completion of an adjustment of the speed of metering conveyor 46c.

When the execution of routine 120 is initiated at 200 upon the leading edge of a package event, position encoder 112 is read at 208 and a CURRENT ETA is calculated for the package breaking the light beam. The CURRENT ETA is calculated by combining the length of conveyor 46c, between photo eye 110 and its discharge point 47, converting the distance to time using table 57, with the remaining affect that any in-process adjustment would have, using table 63. Because the length of the package is not known to the system at this point, a default value is assigned for package length. If the execution of routine 120 is initiated at 202 in response to the trailing edge of a package event, the position encoder 112 is read at 210 and the default value of package length is replaced by the actual length of the package. When execution of routine 120 is initiated by a package releasing event at 204, the program determines at 212 the ETA of the next package that would be optimal (DESIRED ETA) by combining the release time and one-half the length of the package being discharged (converted to time) and the desired spacing between packages (converted to time).

Control passes from blocks 206, 208, 210 or 212 to block 214 where the ETA DIFFERENCE is determined for all packages as the difference between the CURRENT ETA stored for each package and the DESIRED ETA for all packages. The DESIRED ETA for all packages is initially established at 212 in response to a package being released from any line at 204 and is updated in a manner set forth below. From block 214 control passes to 216 where it is determined for a particular package whether the ETA DIFFERENCE is positive, i.e., greater than 0. If so, then the package would arrive at the point of discharge too late and control passes to block 218 where an appropriate adjustment for that package (SUGGESTED ADJ) is selected from lookup tables 59 and 61 on the basis of the value of the ETA DIFFERENCE and the position of the package on the conveyor with respect to the point of discharge. If the value of MAX ADJ obtained by applying the POSITION parameter to lookup table 61 is less than the value of SUGGESTED ADJ obtained by applying the ETA DIFFERENCE value to table 59, then SUGGESTED ADJ will be reduced to MAX ADJ. Once the SUGGESTED ADJ is selected, a SUGGESTED ETA is determined for that package as the CURRENT ETA minus the change in arrival time that will be effected by SUGGESTED ADJ, from which any elapsed speed adjustments that have already been effected with respect to that package while in the control zone (ELAPSED ADJ) is subtracted. If it is determined at 216 that the ETA DIFFERENCE is less than 0 then control passes to block 220 where an appropriate deceleration adjustment (SUGGESTED ADJ) is selected from lookup tables 59 and 61 on the basis of the value of ETA DIFFERENCE and POSITION as previously set forth. The value of SUGGESTED ETA is calculated as the CURRENT ETA plus the change in arrival time that will be effected by the SUGGESTED ADJ minus ELAPSED ADJ.

From block 218 or 220 control passes to block 222 where it is determined whether a SUGGESTED ETA has been calculated for each "top of line" package for each line. If not, control passes to block 216 for determination of the SUGGESTED ETA of the next package. This process continues until a SUGGESTED ETA has been assigned to the "top of line" packages.

When all lines have SUGGESTED ETAs assigned, control then passes from block 222 to block 224 where the control examines the SUGGESTED ETA for all lines and determines the difference between the SUGGESTED ETA for each "top of line" package and the DESIRED ETA for the system. The control selects the line having the minimum difference between SUGGESTED ETA and DESIRED ETA. Any ties are broken by a priority designation that may be fixed to a particular line or may alternate between lines. Once the "best line" is selected in this manner, the CURRENT ETA is replaced with the SUGGESTED ETA for its "selected" package. Control then passes to block 226 where the DESIRED ETA of the system is updated from the CURRENT ETA of the "selected" package. The new DESIRED ETA will equal the CURRENT ETA of the "selected" package plus the length of the "selected" package plus the amount of desired gap to follow the "selected" package with length measurements converted to time using table 57. This new DESIRED ETA will apply to all packages except for the "selected" package. The "selected" package is removed from consideration during further passes through this portion of the routine. The next package will be considered as the "top of line" package for the next iteration.

After the new DESIRED ETA for non"selected" packages in the system has been calculated, control passes to block 228 where it is determined whether all of the lines have had at least one package selected If not, control passes to block 214 where the ETA DIFFERENCE for the packages that have not been selected for each line is determined based on the difference between the CURRENT ETA of that package and the DESIRED ETA. The SUGGESTED ETA for these packages are again calculated in blocks 216 through 222 and a determination of the next "selected" package is made in block 224. Control then passes to block 226 where the newly "selected" package is removed from the selection pool and a new DESIRED ETA is determined for remaining non"selected" packages. Control then passes to block 228 where it is determined whether all lines have had at least one package selected. If so, then the system has determined the line that will discharge the next package, the CURRENT ETA for at least one package on each line and the NEW ADJ for the corresponding induction line, which is the most recently-selected value of SUGGESTED ADJ, to be applied to the line. However, up to control block 228, the system has merely evaluated data and has not effected any control operations.

Control passes from block 228 to block 230 (FIG. 4b) where the status of all lines are checked for the availability of packages. Control passes from block 230 to block 232 where, for the first operational line, it is determined whether the line that is being evaluated is presently engaged in an adjustment operation. If not, then control passes to block 234 where the CURRENT ADJ parameters of the line are modified by NEW ADJ and the CURRENT ETA for the package is updated to reflect the new value of CURRENT ADJ. This is accomplished by obtaining an ETA CHANGE on the basis of the NEW ADJ in lookup table 61 provided in microcomputer 58. The retrieved change in ETA is applied to the CURRENT ETA to provide an updated CURRENT ETA. The adjustment in belt speed is initiated, or put into effect, at this point of the routine. If it is determined in block 232 that the line is presently engaged in an adjustment operation, control passes to block 236 where the CURRENT ADJ is compared with the NEW ADJ, determined in blocks 214 through 228, and makes minor adjustments to the NEW ADJ to compensate for real-time lapses that have occurred during this execution of the control routine. Additionally, the proposed modification to the CURRENT ADJ required by the NEW ADJ is tested to determine if an impermissible result is obtained. If so, the NEW ADJ is modified to make the CURRENT ADJ a permissible value and the new CURRENT ADJ is calculated. The value of CURRENT ETA of the package is modified in the manner set forth in block 234, to reflect the effect of the NEW ADJ on CURRENT ADJ. The speed modification underway is modified according to the new CURRENT ADJ. The timing of the speed changes is implemented at regular intervals in an adjustment routine 300 (FIG. 5) that is initiated separate from routine 120, in real time once every millisecond, to provide precise timing of the adjustments.

From blocks 234 and 236, control passes to a block 238 where it is determined whether the CURRENT ADJ and CURRENT ETA have been recalculated and the speed adjustment control function put into effect for all lines. If not, control passes to block 230. If it is determined at block 238 that all lines have been processed, then control passes to block 240 where the software awaits another event of the type that will initiate another execution of the routine at one of blocks 200, 202, 204 or 206.

Figure 5:
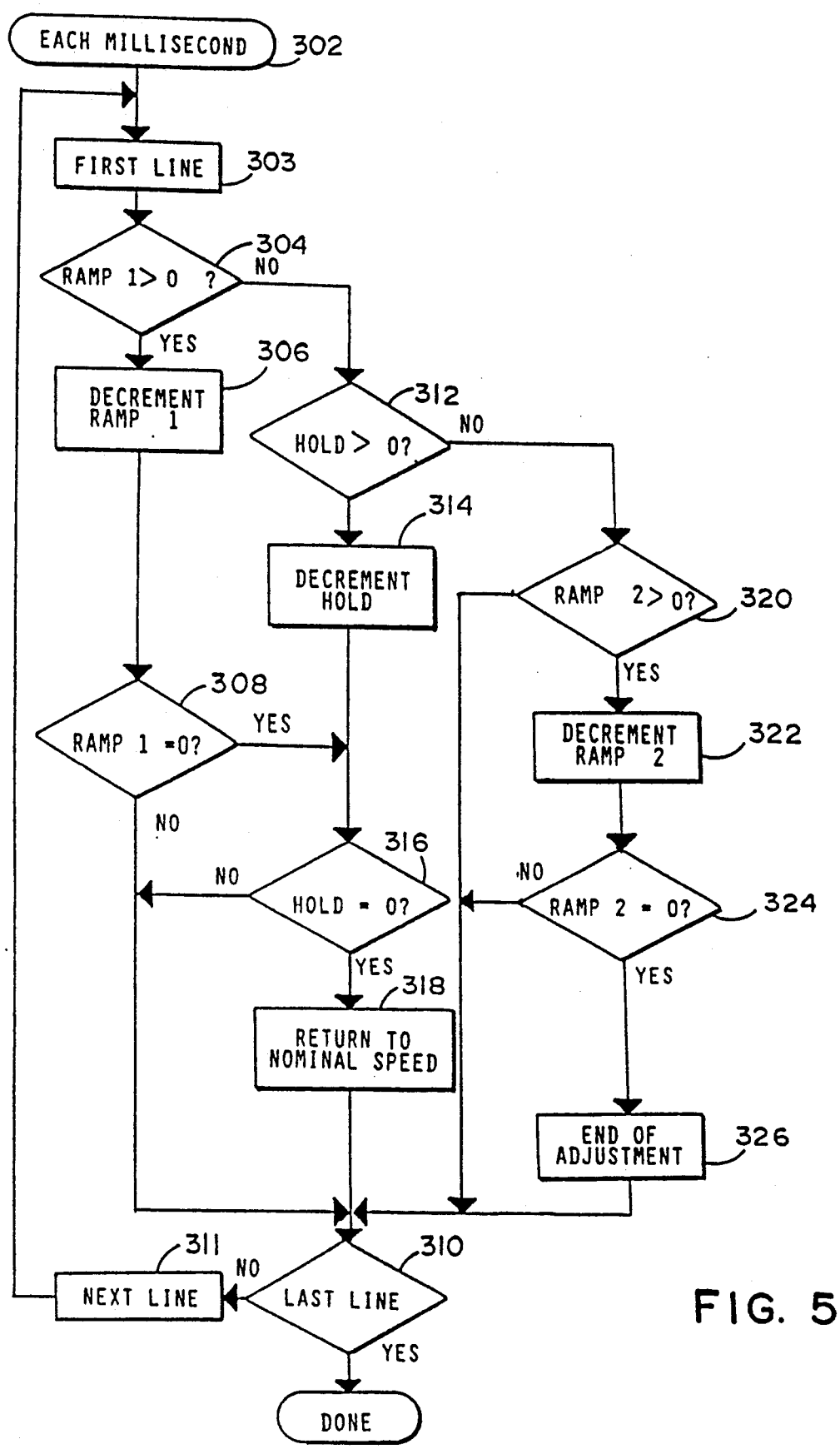
FIG. 5 is a logic flow diagram of the program used to implement conveyor speed changes of the subsystem in FIG. 2.

Once every millisecond in real time, adjustment routine 300 is initiated (302) for the first line (FIG. 5). The program determines for the first line (303) whether (304) there is a ramp 1 adjustment underway. If so, then control passes to block 306 where the number in the ramp 1 event register is decremented by 1 millisecond and to block 308 where it is determined whether the value of the ramp 1 event number, which represents its remaining time duration, has been decremented to zero. If not, then no action is taken and control passes to block 310 where it is determined whether additional lines remain to be examined.

If it is determined at 304 that there is presently no ramp 1 value, then control passes to block 312 where it is determined whether a hold portion of an adjustment is underway. If so, control passes to block 314 where the hold register is decremented and to block 316 where it is determined whether the hold value has been decremented to zero. If not, then no action is taken and control passes to block 310. If it is determined at block 316 that the value in the hold register has been decremented to zero, then control passes to block 318 where microcomputer 58 changes the value of lines 72a–72d or 74a–74d to order a return to nominal speed.

If it is determined at blocks 304 and 312 that no ramp 1 or hold event is underway, control passes to block 320 where it is determined whether a ramp 2 event is underway. If not, no action is taken and control passes to block 310. If a ramp 2 event is underway, then control passes to block 322 where the ramp 2 register is decremented and to block 324 where it is determined if the ramp 2 register has been decremented to zero. If not then no action is taken. If, however, the ramp 2 register has been decremented to zero, control passes to block 326 where an end of adjustment event initiates routine 120 at block 206. If it is determined at block 310 that additional lines remain to be served, then control passes to block 311 for examination of the next line for adjustment events. If all lines are served, then the routine is exited.

As previously set forth, the amount of gap compression between packages is obviously limited at times by the physical parameters of the system, for example a temporary absence of products to induct to the sortation area. The induction subsystem will, however, function to shrink excessive gaps and to stretch gaps that are too short. The present invention increases the capacity, or through-put, of the system and provides the capability for inducting packages from either one line or from multiple lines. An adjustment to the running speed of a metering conveyor is often reversed, cancelled, or extended before it is completely carried out and several packages at a time may be under the control of the scheduler routine for each metering conveyor. In this manner, the system repetitively reevaluates the need for adjustments to line speeds and reverses its previous assessment, if warranted, without carrying out adjustments that will merely require compensating adjustments later. By initiating execution of the scheduler routine only upon the occurrence of events, rather than repetitively, the routine is available, without requiring completion of a partial loop through software, in order to react to real-time events and update parameters rapidly. The use of lookup tables to determine suggested speed adjustments based on ETA DIFFERENCE, for modifying the estimated time of arrival to reflect speed adjustments, to modify ETA based on past speed adjustments and to convert conveyor travel at nominal speed to time and vice versa, is a further enhancement to the speed of execution of the software routine. However, these determinations could alternatively be made by a calculation algorithm.

C) Alternative Embodiment

Figure 8:
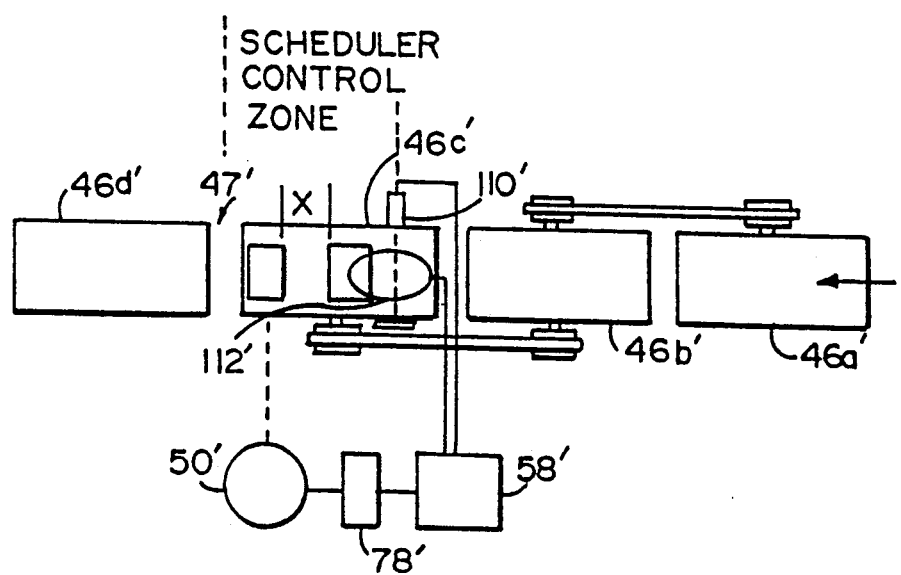
FIG. 8 is a plan view of a first alternative embodiment.

In an alternative embodiment illustrated in FIG. 8, the distance X between the trailing edge of a leading package and the leading edge of subsequent packages is measured on metering conveyor 46c' at photo eye 110' by microcomputer 58 in order to determine if the gap X is equal to the desired gap length. If not, an amount of adjustment (S) that is required is determined.

If the amount of gap adjustment (S) is below a predetermined value, it can be concluded that no hold period is required and $$t_r = 1/2\, t_a = \sqrt{S/a}$$

where
$t_r$ = ramp 1 duration = ramp 2 duration
where $t_a$ = duration of adjustment event
a = absolute magnitude of acceleration
S = difference between desired and actual gap
If the amount of gap adjustment (S) is above a predetermined level, then a hold period will occur and:

$$\begin{aligned} t_{total} &= t_r + t_{max} \\ &= t_r + (S - 2S_r)/(V_{max} - V_{nom}) \end{aligned}$$

where:
$V_{max}$ = Velocity of the discrete adjustment speed level
$V_{nom}$ = Velocity of the nominal speed level
$S_{rm}$ = gap adjustment during ramp 1
Substituting $t_r = (V_{max} - V_{nom})/a$ = constant$_1$ and:
$S_r = \frac{1}{2} a t_r^2$ = constant$_2$
it may be seen that the value of $t_{total}$, which is the parameter that determines the amount of adjustment, is a function of S.

Once the lengths of the ramps and hold are determined and the prior package is discharged to the receiving conveyor, microcomputer 58 provides commands for the duration of ramp 1 and hold periods, requesting speed 0 or 2 and, for the duration of ramp 2 period and beyond, requesting a return to nominal speed. The distance between emitter/detector 110' and point of discharge 47' designated D, is predetermined. Pulses generated by encoder 112' are counted after the trailing edge of a package clears emitter/detector 110' until they equal the distance D minus one-half the length of the article. At this point, microcomputer 58 determines that one-half the length of the package is on conveyor 48d', that is, the package has transitioned to conveyor 46d'. Photo eye 110' is spaced sufficiently from the receiving conveyor that the gap correction may be accomplished and the speed of the metering conveyor returned to nominal before the longitudinal center of a subsequent package reaches the point of discharge.

D) Dual—Servo Induction Subsystem

Induction subsystem 30 establishes a desired gap between packages inducted from multiple lines in a manner that causes the line whose difference between SUGGESTED ETA and DESIRED ETA is at minimum to release its package. Under certain circumstances, one line will discharge more than one package before another line discharges its package. If one line is charged with a succession of very small packages, in comparison with the other line(s), then induction subsystem 30 may discharge exclusively from the line having the small packages while holding up the other line(s). This may occur because, in order to merge packages from more than one line, the system must have full operational control over the trailing package. This condition is present when the distance between the leading and trailing packages is sufficient to allow the conveyor carrying the trailing package to be decelerated to zero speed (STOPPING DISTANCE). It is only under such circumstances of full control over packages on both lines that merging of packages from multiple induct lines can occur. Small packages may not be adequately separated to allow such full operational control of the trailing package. Therefore, merging may be prevented. This domination by one line can create backups in the other line(s), creating an undesirable condition. Additionally, the induction subsystem may have difficulties with larger packages because the initial gap pulled by fixed-speed-ratio conveyors 48a, 48b and 48c is a function of the length of the package. With very large packages, the initial gap could be so long that the induction subsystem has difficulty adjusting the initial gap down to a desired gap length upon discharge to the receiving conveyor.

Accordingly, an embodiment is provided which includes means for narrowing the range of variations in the gaps between packages prior to performing the induction function. This is accomplished in a manner that produces a constant center-to-center spacing between packages discharged onto an induct control conveyor. In this manner, the small gap between small packages will be widened and the large gap between larger packages will be narrowed. This is accomplished by dividing each induction conveyor line into two tandem sections, each of which is operated by an independent servo motor. Instead of three conveyor sections, whose speed-ratios are fixed, this embodiment employs four conveyor sections for each line, with the first two having a fixed speed-ratio and the third and fourth having a fixed speed-ratio. The speed-ratio of the first and second conveyor sections to the third and fourth sections is selectively variable and not fixed. The third and fourth conveyor sections (which are the most downstream with respect to product flow) make up an induct control conveyor which discharges packages in coordination with the other induction lines, in order to establish desired gaps between packages on the sortation subsystem. The first and second conveyor sections make up an initial gap control conveyor that is operated at a speed that is related to the speed of the induct control conveyor according to a ratio which is variable and selectable by the control means. Because the ratio of speeds between the initial gap control conveyor and the induct control conveyor determines the gap between packages positioned on the induction belts, by varying this ratio, an initial gap between packages may be established in a controlled manner in order to narrow the range of gaps which must be adjusted by the induct control conveyor.

The initial gap between packages is accomplished by varying the ratio between the speed of the initial gap control conveyor and the speed of the induct control conveyor. However, the output devices that the control manipulates are the servo motors for the initial gap control conveyor and the induct control conveyor. In order to avoid requiring an excessive amount of computer time to regulate the speed-ratios between the two servos, a unique interface circuit is provided which receives computer commands of the speed required for the induct control conveyor and the speed-ratio that is required between the induct and initial gap control conveyors and produces output signals for selecting the speeds for both servo motors in a manner that provides the required coordination. Accordingly, the amount of computer time devoted to controlling the speeds of the initial gap control conveyor and the induct control conveyor is minimized.

Figure 9:
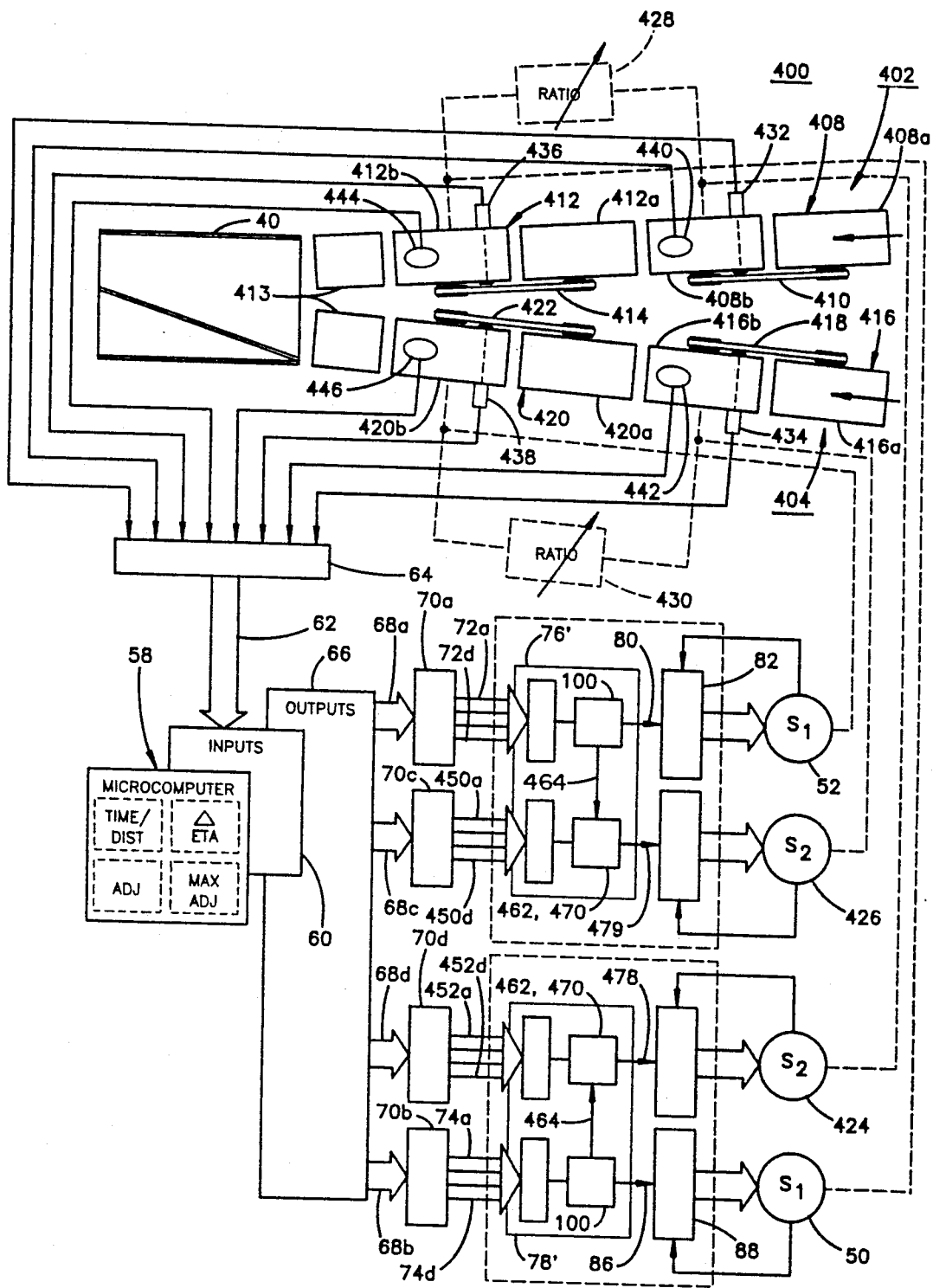
FIG. 9 is the same view as FIG. 2 but of an alternative embodiment of a multiple line induction subsystem.

Induction subsystem 400 includes a first conveyor line 402, a second conveyor line 404 a pair of receiving conveyors 413, for receiving packages from conveyor lines 402 and 404, and a conveyor 40, for merging the packages into a single file (FIG. 9). First conveyor line 402 includes an initial gap control conveyor 408 having first conveyor section 408a and second conveyor section 408b whose mutual speed is fixedly regulated by a speed reducer 410. First conveyor line 402 also includes an induct control conveyor 412 having first conveyor section 412a and second conveyor section 412b whose speeds are fixedly regulated by a speed reducer 414. Likewise, second conveyor line 404 includes an initial gap control conveyor 416 having conveyor sections 416a and 416b whose speeds are fixedly related by a speed reducer 418 and an induct control conveyor 420 having conveyor sections 420a and 420b whose speeds are fixedly regulated by a speed reducer 422. Speed reducers 410, 418 cause conveyor sections 408b, 416b to operate faster than the respective sections 408a, 416a which are upstream thereof. Likewise, speed reducers 414 and 422 cause conveyor sections 412b, 420b to operate at a higher speed than respective sections 412a, 420a which are upstream thereof. Receiving conveyors 413 and alignment conveyor 40 are operated at a constant, common speed.

First conveyor line 402 includes an $S_1$ servo motor 50 to drive induct control conveyor sections 412a, 412b and an $S_2$ servo motor 424 to drive initial gap control conveyor sections 408a, 408b. Likewise, second conveyor line 404 includes an $S_1$ servo motor 52 to drive induct control conveyor sections 420a, 420b and an $S_2$ servo motor 426 to drive initial gap control conveyor sections 416a, 416b. Although the $S_1$ and $S_2$ servo motors for each conveyor line are capable of independent operation, they are controlled, as will be set forth in detail below, in a manner that produces a variable speed ratio, illustrated at 428, between initial gap control conveyor 408 and induct control conveyor 412 on a first conveyor line 402 and a variable speed ratio 430 between initial gap control conveyor 416 and induct control conveyor 420 on second conveyor line 404. Variable ratios 428 and 430 are illustrated in phantom because there is no mechanical coupling, per se, between the initial gap control conveyor and the induct control conveyor for each line.

An input module 64 associated with microcomputer 58 receives input signals from photodetectors 432, 434 associated, respectively, with initial gap control conveyor sections 408b, 416b and photodetectors 436, 438 associated, respectively, with induct control conveyor sections 412b, 420b. input module 64 additionally receives input signals from pulse position indicators (PPI) 440, 442, 444 and 446 associated, respectively, with conveyor sections 408b, 416b, 412b and 420b. Input module 64 provides parallel inputs 62 to microcomputer 58. Microcomputer 58 includes an output circuit board 66 which provides parallel outputs 68a, 68b, 68c and 68d, respectively, to output modules 70a, 70b, 70c and 70d. Output module 70a provides output signals on four parallel lines 72a thru 72d that are presented to a servo interface circuit 76' as selection lines for one of four running speeds for servo motor 52 (only three running speeds are used in the illustrated embodiment). Output module 70b provides output signals on lines 74a thru 74d that are presented to a servo interface circuit 78' as running speed selection lines for servo motor 50. Output module 70c provides a combination of output signals on lines 450a thru 450d that are presented to servo interface circuit 76' as a ratio selection to establish the speed of $S_2$ servo motor 426 with respect to the speed of $S_1$ servo motor 52. Output module 70d provides a combination of output signals on lines 452a thru 452d that are presented to servo interface circuit 78' as a ratio selection to establish the speed of $S_2$ servo motor 424 with respect to $S_1$ servo motor 50.

Figure 10:
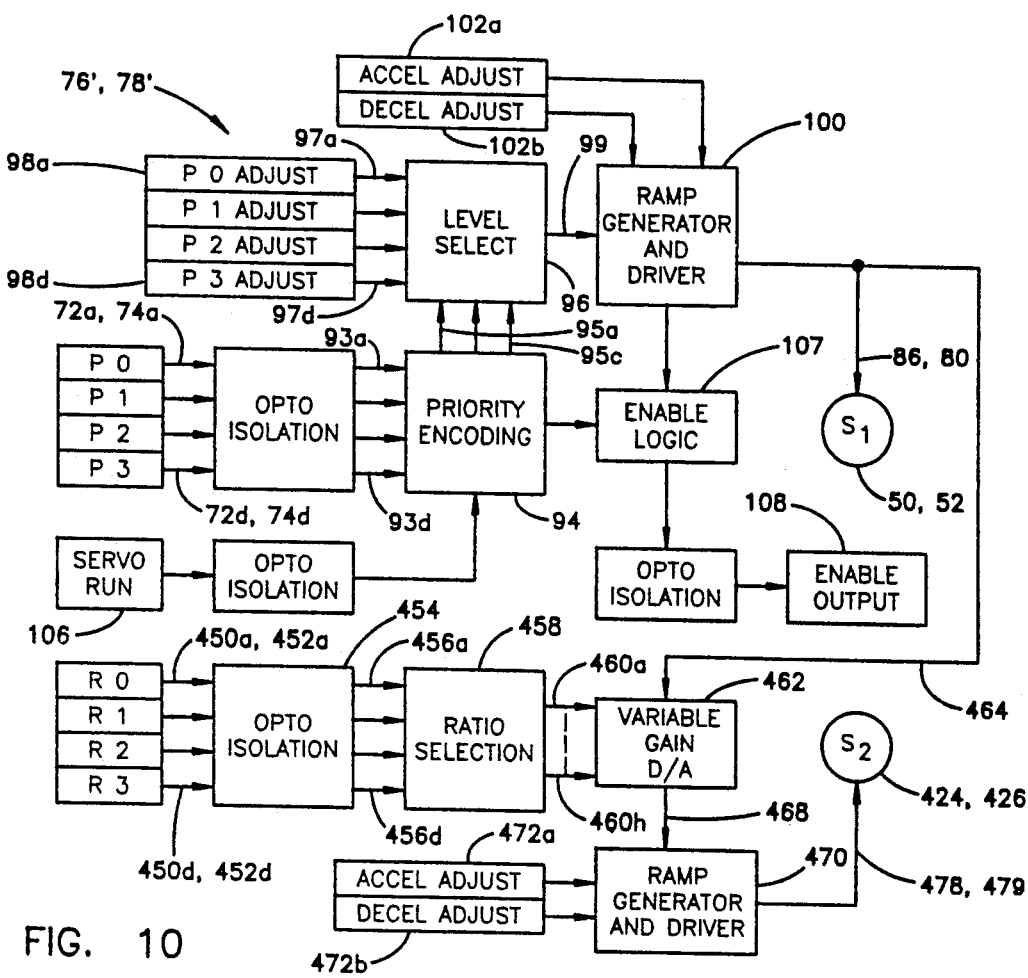
FIG. 10 is a circuit diagram in block form of an interface circuit between the microcomputer and the servo motor control for the subsystem in FIG. 9.

Servo interface circuits 76', 78' include substantially the same components as servo interface circuits 76, 78 for providing a DC output signal on lines 86, 88, respectively, to $S_1$ servo motors 52, 50. In addition, each servo interface circuit 76', 78' includes an optical isolation circuit 454 for receiving ratio selection input lines 450a thru 450d or 452a thru 452d and produces corresponding outputs 456a thru 456d to a ratio selection circuit 458 (FIG. 10). Ratio selection circuit 458 responds to the condition of lines 456a thru 456d, which may be in one of sixteen states, in combination, and produces a parallel digital output on lines 460a–460h corresponding to the state of lines 456a thru 456d. The signal on lines 460a–460h, which is an eight bit parallel word, is provided to a variable gain digital to analog converter (DAC) 462 which also receives an induct servo speed signal input on line 464 corresponding to the analog DC signal provided to the respective $S_1$ motor 50, 52 on associated line 80, 86. The digital word from lines 460a–460h represents one of sixteen preestablished ratio values from which microcomputer 58 may choose. The analog signal on line 464 is proportional to the speed of the $S_1$ motor 50, 52. Variable gain digital to analog converter 462 produces an analog DC signal on line 468 which is the analog equivalent of the digital word from line 460 as multiplied, or scaled, by the analog signal on line 464. The analog signal on line 468 represents a speed selected for $S_2$ motor 424, 426. Line 468 is provided to a ramp generator and driver circuit 470, which produces an output on line 478, 479 that responds to changes in the signal level on line 468 in the same manner that ramp generator and driver 100 responds to changes in the signal level on line 99. Ramp generator and driver circuit 470 also receives inputs 472a, 472b, which provide manual selection of the rate of response of output 478, 479 to changes in the analog signal on line 468. The signal on line 478, 479 provides an initial gap servo speed output signal for establishing the speed of the respective $S_2$ motor 424, 426. Enable output 108 is provided to both $S_1$ and $S_2$ motors to selectively enable or disable both motors together.

Figure 12:
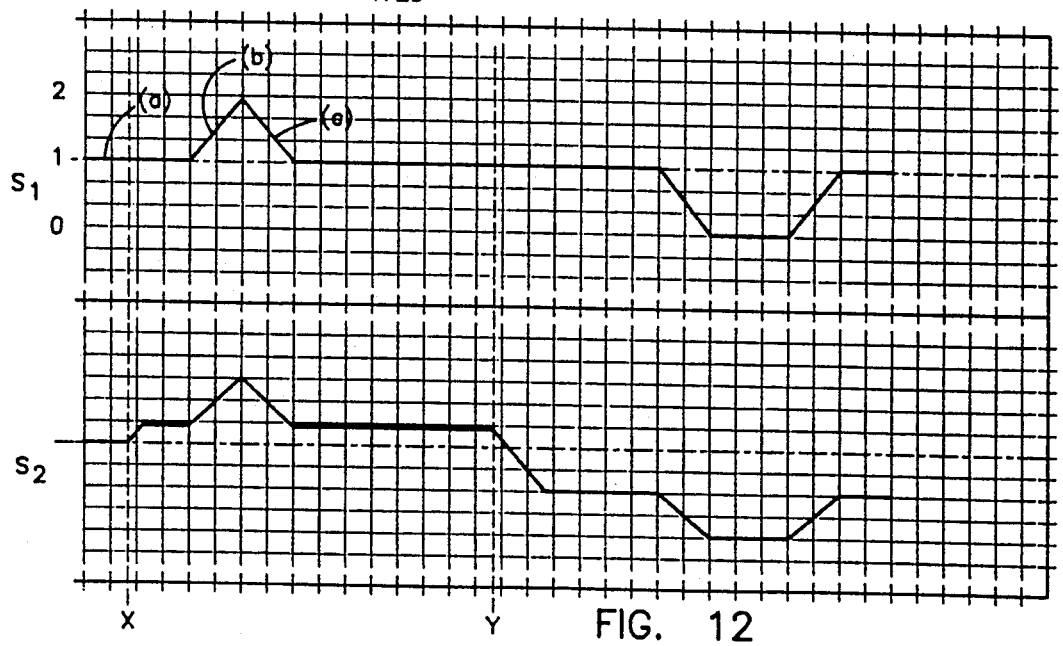
FIG. 12 is a diagram of the conveyor speed for the induct control and initial gap control conveyors of a conveying line portion of the subsystem in FIG. 9.

Operation of servo interface circuits 76', 78' can be understood by reference to FIGS. 10 and 12 in which the output signal on lines 80, 86 to the respective $S_1$ motor is illustrated accelerating from nominal speed 1 at (a) towards increased running speed 2 at (b) and then decelerating back towards nominal speed at (c). The signal applied at lines 478, 479 to the respective $S_2$ motor 424, 426 is shown tracking the nominal speed of $S_1$ motor at (a) until a change in the ratio selection signal on lines 450a thru 450d or 452a thru 452d is received at X, at which time the speed of motor $S_2$ is increased even though the speed of motor $S_1$ remains constant. The speed of the $S_2$ motor increases with that of $S_1$ at (b) and decreases with that of $S_1$ at (c) but the ratio between $S_1$ and $S_2$ remains constant. At point Y, the ratio selection signal is decreased so that the speed of motor $S_2$ decreases with respect to that of motor $S_1$. The purpose of the controlled ramp between speed changes of $S_2$ motors is the same as that for the $S_1$ motor: namely, to avoid excessive acceleration and deceleration that could topple packages or cause them to slip. In the illustrated embodiment, the ramp for the $S_1$ motor is set to 0.4 g and that for the $S_2$ motor is set to 0.5 g.

Figure 11A:
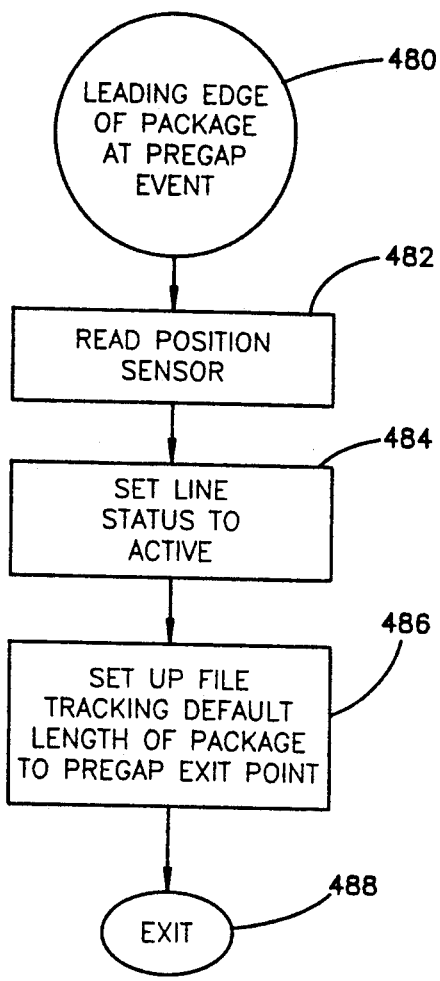
FIGS. 11a–11d are a logic flow diagram of the program used to control the initial gap function of the subsystem in FIG. 9.
Figure 11B:
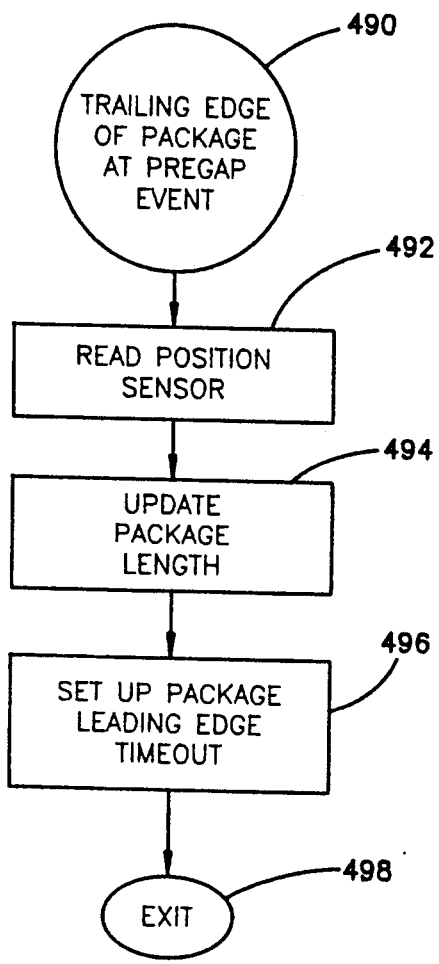

Operation of induction subsystem 400 can be understood by reference to FIGS. 9 and 11a–11d. When a package traverses from initial gap conveyor section 408a, 416a, respectively, to 408b, 416b, the increase in speed will lengthen the gap with a following package. When the leading edge of the package reaches photodetector 432, 434 the system initiates a "leading edge of package at pregap" event 480 (FIG. 11a). Because the software of computer 448 is event driven, the occurrence of event 480 causes the computer to read the value of the respective position sensor 440, 442 at 482 and to set a status flag at 484 indicating that the particular conveyor line 402, 404 is active at 484. The control then sets up a file at 486 for that particular package being detected by the photodetector at 486. The file that is set up includes default values for the length of the package and the distance between the longitudinal center point of that package and the pregap exit point, which is the point between conveyors 408b and 412a or 416b and 420a. The program is then exited at 488.

When the photodetector 432, 434 detects the trailing edge of the same package, the control initiates a "trailing edge of package at pregap" event 490 which causes the control to read the present value of position sensor 440, 442 at 492 and to update the default value of the package length at 494 based upon the readings of the position sensor at 482 and 492. An internal software counter, which is decremented in response to the output pulses of position sensor 440, 442 is started at 496 and the routine is exited at 498. The leading edge time out counter set at 496 continues to decrement until another "leading edge of package at pregap" event 480 occurs. If event 480 does not occur before the leading edge time out is fully decremented at 496, a "leading edge time out" event 500 causes the control to set the line active/inactive status to "inactive" at 502 and to exit the routine at 504. The inactive status indicates that packages are not being received on that particular line at the induction subsystem.

Figures 11C, 11D:
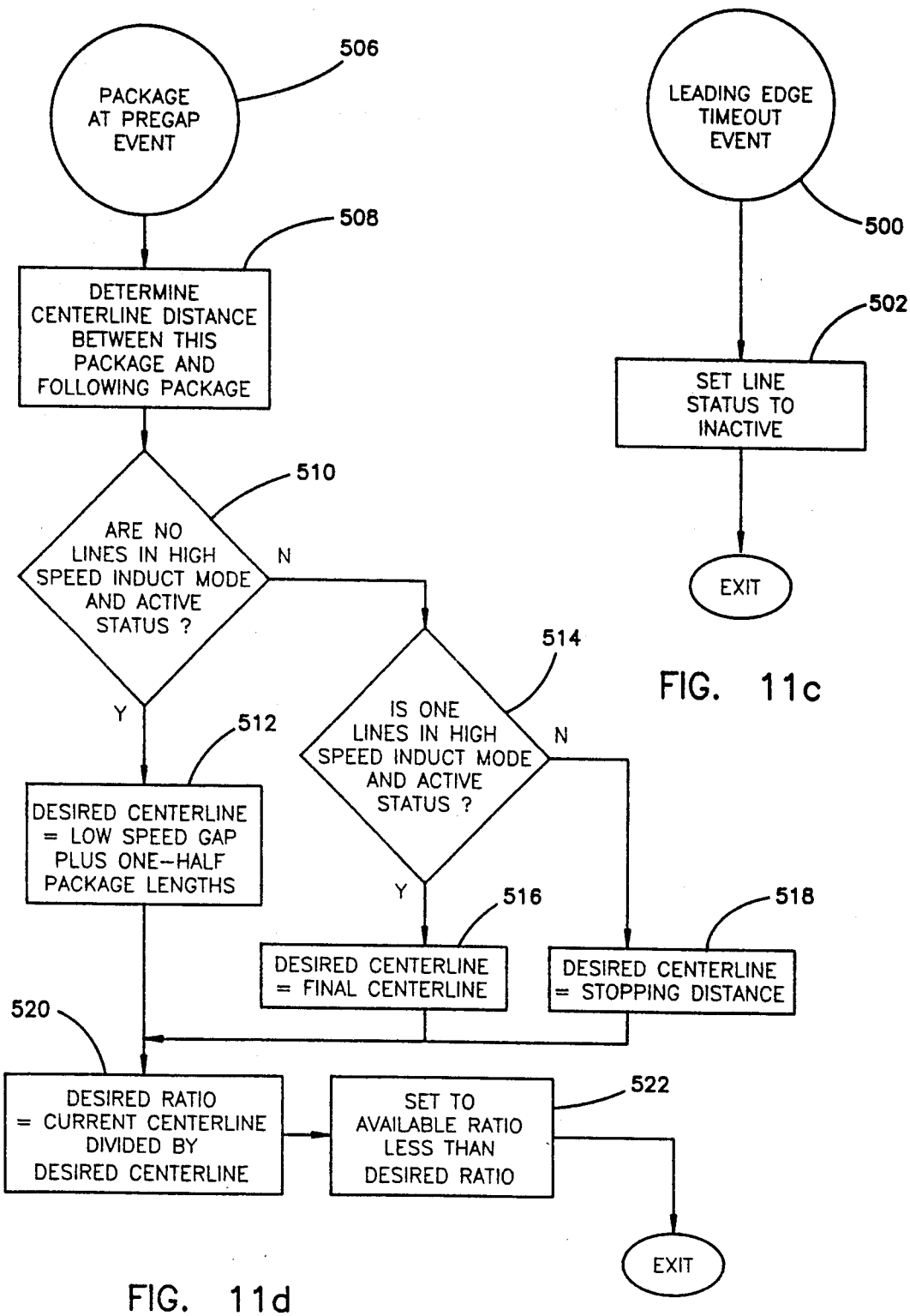

The control tracks the position of the packages in the area of pregap control between photodetectors 432, 434 and position sensors 440, 442, respectively. When the centerline of the package in the area of pregap control reaches the gap between conveyors 408b, 416b and 412a, 420a, respectively, a "package at pregap" event 506 initiates a routine in which the centerline distance between the package and the following package is determined at 508 (FIG. 11d). The control then determines at 510 whether there are, or are not, any lines in both a high-speed mode and active status. A line may be placed in non-high-speed mode by the operator of the system or as a result of an operational fault such as an overturned package, or the like. The active/inactive status is set at 484 or 502 in response to the presence or absence of packages on that line. If there are no lines that are in both the high-speed induct mode and active status, control passes to 512 where a low-speed induct control function is performed. A DESIRED CENTERLINE is calculated as a value that is equal to a desired gap between packages discharged from the induct control conveyor 412b, 420b plus the average of the lengths of the package in the area of pregap control and the following package.

If it is determined at 510 that the system is not in a condition where there are no lines in both high-speed induct mode and active status, control passes to 514 where it is determined whether there is only one line in a high-speed induct mode and active status, or more than one line in such state. If it is determined at 514 that only one line is a high-speed induct mode and active status, the control is in a single-line induct mode and the control determines at 516 a DESIRED CENTERLINE between packages in the area of pregap control as equal to a FINAL CENTERLINE. As will be set forth in more detail below, because the system is in a single-line induct mode, there is no need to be concerned with the merging of packages from another line. The gap between packages will be determined by the induct control portion of the control algorithm.

If it is determined at 514 that there is not only one line in the high-speed induct mode and active status, then the system is in a multiline induct mode 518. In such mode, it is necessary for packages within the area of pregap control of a particular line to be merged with packages on another line. In order to accomplish the merging, it is necessary that the respective induct conveyor 412, 420 be capable of taking full control over the trailing package after the leading package has been discharged to the receiving conveyor 413. This may be accomplished by setting the DESIRED CENTERLINE between the leading and following packages at the minimum distance that the induct conveyor, traveling at its present speed, can be decelerated to zero speed (STOPPING DISTANCE). It is only under such circumstances that full control over the following package is provided on the induct conveyor.

Once a DESIRED CENTERLINE is determined at 512, 516 or 518, control passes to 520 where the value of variable ratio 428, 430 (DESIRED RATIO) is established. DESIRED RATIO is calculated by dividing the current centerline between the packages in the area of pregap control with the DESIRED CENTER LINE established at 512, 516 or 518. When the DESIRED RATIO is calculated, the control produces selection signals at 522 on lines 450a thru 450d or 452a thru 452d to select the closest ratio increment that is less than the calculated DESIRED RATIO. The routine is exited at 524. In determining DESIRED RATIO, the control ignores any effect from the ramp generator and driver circuit 420. Any resulting errors introduced thereby are too small to be of concern.

In the illustrated embodiment, initial gap control conveyor sections 408b, 416b operate at a nominal speed of 300 feet per minute with a range of speeds from 0 to 450 feet per minute. Initial gap control conveyor sections 408a, 416a are linked with sections 408b, 416b with a 1:2.1 speed reducer to provide a nominal speed of conveyor sections 408a, 416a of 143 feet per minute. The nominal speed of induct control conveyor sections 412b, 420b is 400 feet per minute with a range of 0 to 600 feet per minute. A 1:1.3333 mechanical coupling with induct conveyor section 410a, 420a provides reduction to 300 feet per minute nominal speed of induct control conveyor sections 412a, 420a. The range of selectable ratios 428, 430 are from 0:1 to 1:1 in 16 selectable steps. For reasons that will be explained in more detail below, receiving conveyors 413 and alignment conveyor 40 are operated at a constant speed of 540 feet per minute, which is higher than the nominal speed of induct control conveyor sections 412b, 420b.

Although the above describes the preferred embodiment, variations will suggest themselves to those of skill in the art. Although the electronic couplings 428, 430 provide a maximum ratio of 1:1 in the illustrated embodiment, it is possible to have a ratio greater than 1:1 so that the initial gapping conveyor is capable of reducing, as well as lengthening, the pre-initial gap between packages produced by the speedup between conveyor sections 408a, 416a and 408b, 416b, respectively. Although separate position monitors 444, 446 for the induct control conveyors, and position monitors 440, 442 for the initial gap control conveyors are provided, it is possible to utilize the information provided from the position monitors 444, 446 associated with the induct control conveyors in combination with the speed-ratio selected by the system, between the initial gap control conveyor and the induct control conveyor, in order to provide a position indication for packages on the initial gap control conveyor.

The present invention produces a narrowing in the variation of edge-to-edge spacing, or gap, between packages in the induction subsystem. This is accomplished, conveniently, by producing a constant spacing between the longitudinal center lines of packages irrespective of their length. By reducing the variation in gaps prior to the induction control zone, the induction algorithm is able to operate more efficiently in producing desired gaps between packages merged from multiple lines. An additional benefit is that, although the induction control system still selects packages for discharging based upon the one whose leading edge will arrive at an estimated time of arrival that is closest to a desired time of arrival, there will be a greater tendency to alternate discharge of packages between multiple lines rather than repetitively inducting from the same line when a slug of small packages enters the system. Additionally, excessive gaps between very large packages will be reduced. On a theoretical basis, it is estimated that the through-put of the induction subsystem will increase by approximately 18-percent. This is a significant improvement considering the tremendous through-put achieved by the induction subsystem 30 with respect to systems in the prior art.

E) Speed-Change Between Induction Subsystem and Sortation Subsystem

The desired gap established between packages inducted to a sortation subsystem is for the purpose of facilitating sortation of the packages. Such a gap may be of uniform length or may be a function of other variables, such as the width of the package. For example, many sortation subsystems divert packages onto spurs in a manner that rotates the package while it is being diverted. The rotation of the package lengthens the package, in the direction of movement of the conveyor, as a function of the width of the package. While the desired gap is required at the sortation subsystem, it is established in the induction subsystem.

Although the gap, or edge-to-edge spacing, between packages is established in the induction subsystem, the spacing between packages required for proper induction and merging of the packages from multiple lines is substantially less than the final desired gap required at the sortation subsystem. Accordingly, the present invention makes use of this consideration by slowing down the line speeds of the induction subsystem with respect to the sortation subsystem in order to more accurately induct the packages while establishing gaps between packages in the induction subsystem that will result in the desired gaps on the sortation subsystem necessary for sortation. The increase in gap length is a result of the increase in speed, or speed-ratio, between induction subsystem 30, 400 and sortation subsystem 22.

Figure 14:
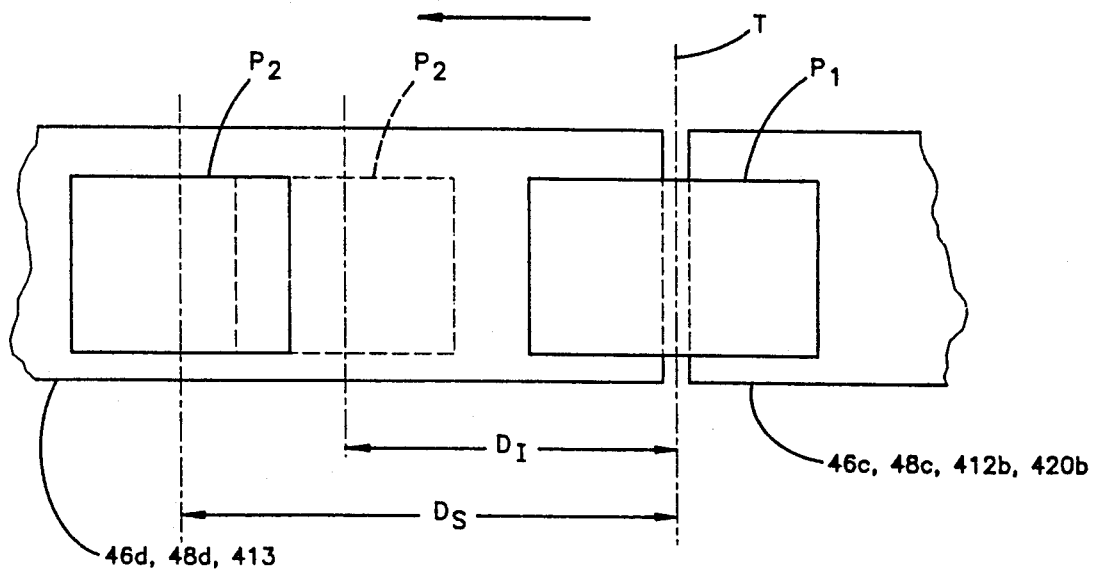
FIG. 14 is a plan view illustrating the effect of a speed change at the transition between an induction subsystem and a sortation subsystem.

Because the conveyor system in the illustrated embodiment utilizes belt conveyors, the relative spacing between products is altered at transition points between belts of different speeds as a function of the position of the centerline of the package with respect to the leading and trailing belts. Prior to the longitudinal centerline of a package reaching a transition point between two belts, the speed of the package is established by the leading belt 46c, 48c, 412b, 420b (FIG. 14). After the centerline passes the transition point T, the speed of the package is established by the speed of the trailing belt 46d, 48d, 413. Accordingly, the centerline spacing between packages after a speed increase $D_s$ is proportional to the speed-ratio of the belts and the centerline spacing between the packages prior to the speed increase $D_I$. In the present system, the desired gap is established with respect to the trailing edge of the lead package and the leading edge of the following package.

Accordingly, the desired gap $D_I$ on the sortation subsystem 22 is equal to the centerline spacing $D_s$ of the packages after the speed increase minus one half of the combined lengths of the packages. This relationship is utilized by either induction subsystem 30 or 400 in order to induct packages in a manner that the desired gap is set with respect to a speed increase between the induction subsystem and the sortation subsystem. In the illustrated embodiments, the speed increase occurs between the nominal speed of metering conveyors 46c, 48c or induct control conveyors 412, 420, and the constant speed of their respective receiving conveyors 46d, 48d, 413. The line speed of the sortation subsystem is matched to that of receiving conveyors 46d, 48d, 413. Because the speed of the metering conveyors and induct control conveyors is always adjusted to nominal speed prior to the discharge of a package, this increase in speed from nominal speed to the fixed speed of the respective receiving conveyor will determine the increase in center-to-center package spacing. The speed increase is provided at this point because the conveyors involved all have the same surface frictional characteristics. Accordingly, the affect of the speed increase on the package spacing is more predictable and consistent. In the illustrated embodiment, the nominal speed of induct control conveyor sections 412b, 420b is 400 feet per minute and the speed of receiving conveyors 413 is 540 feet per minute to provided a speed ratio of 1:1.35 at transition T (FIG. 14).

Figure 13:
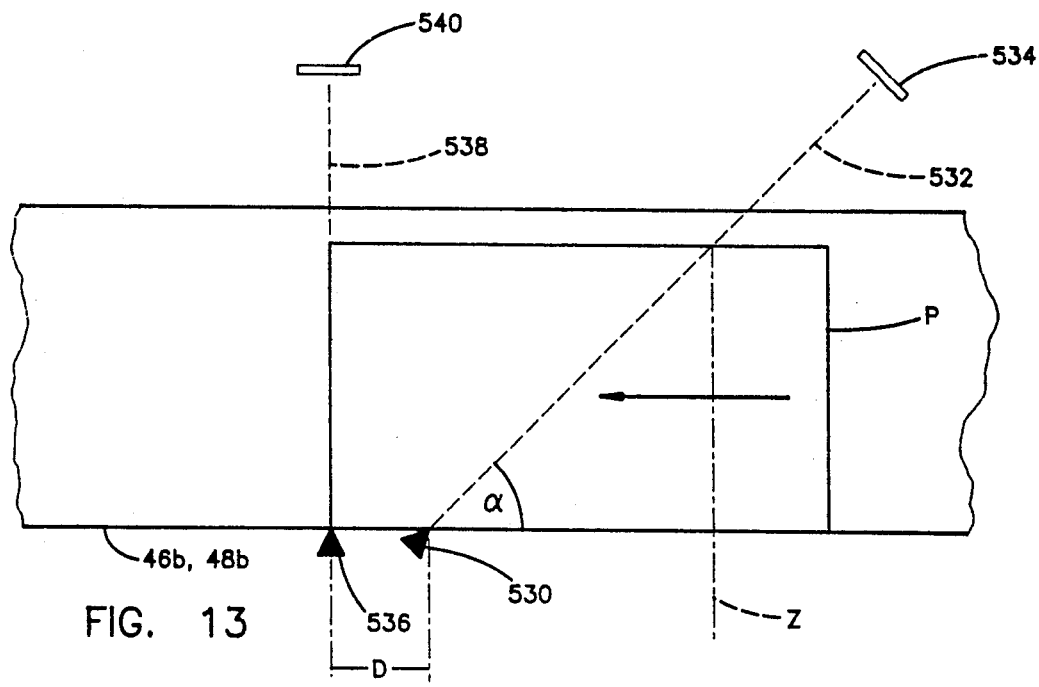
FIG. 13 is a plan view of a control technique for measuring the width of packages.

Because the desired gap on the sortation subsystem may preferably be a function of the width of packages, the present invention provides a convenient technique for measuring package width. A first photodetector 530 is positioned to establish a beam of light 532 at a 45-degree angle $\alpha$, with respect to the direction of movement of packages on conveyor 412, 420 as illustrated by the arrow (FIG. 13). A reflector 534 reflects the beam back to detector 530 whenever a package is not blocking beam 532. A second photodetector 536, which is downstream of photodetector 530, is positioned to shine its beam 538 perpendicular to the movement of the package, designated P. A reflector 540 is positioned to reflect beam 538 back to photodetector 536. When package P reaches point Z, it will block beam 532. The control counts the number of increments from position indicator 444, 446 until the leading edge of package P additionally breaks beam 538 of photodetector 536. The control converts the number of increments counted from the position indicator 444, 446 to a distance measurement and subtracts the offset distance D between photodetectors 530 and 536. Because beam 532 is established at a 45-degree angle with respect to the movement of packages on conveyor 412b, 420b, the calculated distance is equivalent to the width of the package. While the principal is illustrated for angle $\alpha$ equal to 45-degrees, it will be appreciated that other angles may be utilized and appropriate adjustments made to the calculations.

Other changes and modifications in the specifically described embodiments can be carried out without departing from the principles of the invention which is intended to be limited only by the scope of the appended claims, as interpreted according to the principles of patent law, including the doctrine of equivalents.

The embodiments of the invention in which an exclusive property or privilege is claimed are defined as follows.

1. In a conveyor system including an induction subsystem adapted to merging packages from at least two conveyor lines and discharging packages with desired spacing between packages and control means for controlling said induction subsystem, the improvement comprising:

said induction subsystem including at least two induct control conveyors and an initial gap control conveyor associated with each induct control conveyor upstream of that induct control conveyor; and said control means including means for controlling the speed of said induct control conveyors in a manner that will merge packages from said induct control conveyors with desired spacing between packages and for controlling the speed of each said initial gap control conveyor as a function of the speed of the associated induct control conveyor and a variable ratio parameter that is selected to provide controlled spacing between packages on the associated said induct control conveyor.

2. The conveyor system in claim 1 wherein said control means provides said controlled spacing between the centerlines of packages on said induct control conveyors.

3. In a conveyor system including an induction subsystem adapted to merging packages from at least two conveyor lines discharging packages with desired spacing between packages and control means for controlling said induction subsystem, the improvement comprising:

said induction subsystem including at least two induct control conveyors and an initial gap control conveyor associated with each induct control conveyor upstream of that induct control conveyor.

said control means including means for controlling the speed of said induct control conveyors in a manner that will merge packages from said induct control conveyors with desired spacing between packages and for controlling the speed of each said initial gap control conveyor in a manner that will provide controlled spacing between packages on the associated said induct control conveyor; and wherein each of said induct control conveyors includes speed control means for responding to said control means to vary the speed of the associated said induct control conveyor between a low-speed and at least one speed that is greater than said low-speed and wherein said control means provides said controlled spacing between packages on each said induct control conveyor as a function of the time it takes said speed control means to cause that said induct control conveyor to switch from a particular speed to said low-speed.

4. The conveyor system in claim 3 wherein said control means provides said controlled spacing between the centerlines of packages on said induct control conveyors.

5. In a conveyor system including a sortation subsystem adapted to sorting packages onto selected spurs, an induction subsystem adapted to discharging packages to said sortation subsystem with desired spacing between packages and control means for controlling said induction subsystem, the improvement comprising:

said induction subsystem including at least one induct control conveyor and an associated initial gap control conveyor upstream of said induct control conveyor; and said control means including means for controlling the speed of said induct control conveyor in a manner that will create said desired spacing between packages on said sortation subsystem and for controlling the ratio of the speed of said induct control conveyor to the speed of said initial gap control conveyor in a manner that will provide controlled spacing between packages on said induct control conveyor, said ratio being selected from a group of at least four selectable ratio values.

6. The conveyor system in claim 5 wherein said control means includes a first variable speed motor operatively connected with said at least one induct control conveyor, a second variable speed motor operatively connected with said associated initial gap control conveyor and means for controlling the speed of said second variable speed motor as a function of the speed of said first variable speed motor.

7. The conveyor system in claim 5 wherein said induction subsystem includes two said induct control conveyors and associated initial gap control conveyors and wherein said control means controls the speed of both induct control conveyors in a manner that will cause said induction subsystem to merge packages from both said induct control conveyors.

8. The conveyor system in claim 7 wherein said control means includes first and second variable speed motors operatively connected respectively with each of said induct control conveyors, third and fourth variable speed motors operatively connected respectively with each of said associated initial gap control conveyors and means for controlling the speed of each of said third and fourth variable speed motors as a function of the speed of the one of said first and second variable speed motors operatively connected with the associated induct control conveyor.

9. In a conveyor system including a sortation subsystem adapted to sorting packages onto selected spurs, an induction subsystem adapted to discharging packages to said sortation subsystem with desired spacing between packages and control means for controlling said induction subsystem, the improvement comprising:

said induction subsystem including at least one induct control conveyor and an associated initial gap control conveyor upstream of said induct control conveyor;

said control means including means for controlling the speed of said induct control conveyor in a manner that will create said desired spacing between packages on said sortation subsystem and for controlling the ratio of the speed of said induct control conveyor to the speed of said initial gap control conveyor in a manner that will provide controlled spacing between packages on said induct control conveyor;

said control means including a first variable speed motor operatively connected with said at least one induct control conveyor, a second variable speed motor operatively connected with said associated initial gap control conveyor and means for controlling the speed of said second variable speed motor as a function of the speed of said first variable speed motor; and said control means further including first selection means for selecting a speed of said first variable speed motor, second selection means for selecting a ratio of speed between said first and second variable speed motors and wherein said means for controlling the speed of said second variable speed motor is responsive to said first and second selection means.

10. In a conveyor system including an induction subsystem adapted to merging packages from at least two conveyor lines and to discharging packages with desired spacing between packages and control means for controlling said induction subsystem, the improvement comprising:

said induction subsystem including at least two induct control conveyors and an initial gap control conveyor associates with each induct control conveyor upstream of that induct control conveyor;

said control means including means for controlling the speed of said induct control conveyors in a manner that will merge packages from both said induct control conveyors with desired spacing between packages and for controlling the ratio of the speed of each induct control conveyor to the speed of the associated initial gap control conveyor in a manner that will provide controlled spacing between packages on each said induct control conveyor;

said control means including first and second variable speed motors operatively connected one with each of said two induct control conveyors, third and fourth variable speed motors operatively connected one with each of the initial gap control conveyors associated with the two induct control conveyors and means for controlling the speed of each of said third and fourth variable speed motors as a function of the speed of the one of said first and second variable speed motors operatively connected with the associated induct control conveyor; and said control means further including first and second selection means for selecting speeds of said first and second variable speed motors, third and fourth selection means for selecting speed ratios respectively between said first and third variable speed motors and between said second and fourth variable speed motors and wherein said means for controlling the speed of each of said third and fourth variable speed motors is responsive to said first, second, third and fourth selection means.

11. In a conveyor system including a sortation subsystem adapted to sorting packages onto selected spurs, an induction subsystem adapted to discharging packages to said sortation subsystem with desired spacing between packages and control means for controlling said induction subsystem, the improvement comprising:

said induction subsystem including at least one induct control conveyor and an associated initial gap control conveyor upstream of said induct control conveyor; and said control means including means for controlling said induct control conveyor in a manner that will produce desired edge-to-edge spacing between packages inducted to said sortation subsystem, said control means further including determining means for determining centerline location of packages on said associated initial gap control conveyor and means responsive to said determining means for controlling said associated initial gap control conveyor in a manner that will produce controlled center-to-center spacing between packages on said induct control conveyor.

12. The conveyor system in claim 11 wherein said induction subsystem includes two said induct control conveyors and associated initial gap control conveyors and wherein said control means controls the speed of both induct control conveyors in a manner that will cause said induction subsystem to merge packages from both said induct control conveyors.

13. In a conveyor system including an induction subsystem adapted to merging packages from at least two conveyor lines and discharging packages with desired spacing between packages and control means for controlling said induction subsystem, the improvement comprising:

said induction subsystem including at least two induct control conveyors and an initial gap control conveyor associated with each induct control conveyor upstream of that induct control conveyor;

said control means including means for controlling said induct control conveyors in a manner that will merge packages from both said induct control conveyors with desired edge-to-edge spacing between packages and for controlling each associated initial gap control conveyor in a manner that will produce controlled center-to-center spacing between packages on each said induct control conveyor; and each of said induct control conveyors including speed control means for responding to said control means to vary the speed of the associated said induct control conveyor between a low-speed and at least one speed that is greater than said low-speed and wherein said control means provides said controlled center-to-center spacing between packages on said induct control conveyor as a function of the time it takes said speed control means to cause each said induct control conveyor to switch from a particular speed to said low-speed.

14. In a conveyor system including a sortation subsystem adapted to sorting packages onto selected spurs, an induction subsystem adapted to discharging packages to said sortation subsystem with desired spacing between packages and control means for controlling said induction subsystem, the improvement comprising:

said induction subsystem including at least one induct control conveyor and an associated initial gap control conveyor upstream of said induct control conveyor; and said control means including means for controlling said induct control conveyor in a manner that will produce desired edge-to-edge spacing between packages inducted to said sortation subsystem and for controlling said associated initial gap control conveyor in a manner that will produce controlled center-to-center spacing between packages on said induct control conveyor, wherein said control means controls said induct control conveyor to discharge packages to said sortation subsystem at a speed different from the line speed of said sortation subsystem and includes means for determining edge-to-edge spacing between packages on said induct control conveyor as a function of the ratio of said speeds.

15. In a conveyor system including an induction subsystem having at least two conveyor lines, a sortation subsystem which receives packages from said induction subsystem and discharges packages selectively to take-away lines and control means for controlling said conveyor lines, the improvement comprising:

said induction subsystem having first conveying means operative to convey packages at a first predetermined speed;

said sortation subsystem having second conveying means operative to convey packages at a second predetermined speed that is different from said first speed; and said control means including means for controlling said induction subsystem in a manner that will cause desired gaps between packages after the packages are received on said sortation subsystem, wherein said means for controlling is responsive at least to the ratio between said first and second speeds.

16. The conveyor system in claim 15 wherein said means for controlling is further responsive to the length of packages in the direction of movement of said packages.

17. The conveyor system in claim 16 wherein said means for controlling is further responsive to the width of packages in the direction of movement of said packages.

18. A conveyor system including a sortation subsystem adapted to sorting packages onto selected spurs, an induction subsystem adapted to discharging packages to said sortation subsystem with desired spacing between packages and control means for controlling said induction subsystem, the improvement comprising:

said induction subsystem including at least two induction lines, each of said induction lines having an induct control conveyor and an associated initial gap control conveyor upstream of said induct control conveyor;

said control means including first means for controlling the speed of each said induct control conveyor in a manner that will merge packages from both said induction lines and provide desired spacing between packages on said sortation subsystem, said control means further including second means for controlling the speed of each said initial gap control conveyor in a manner that will provide controlled spacing between packages on the associated said induct control conveyor;

said first means including first and second variable speed motors operative connected respectively with each of said induct control conveyors and first and second selection means for selecting a speed respectively of said first and second variable speed motors; and said second means including third and fourth variable speed motors operatively connected respectively with each of said associated initial gap control conveyors, third and fourth selection means for selecting a ratio of speeds respectively between said first and third variable speed motors and said second and fourth variable speed motors and means responsive to said first, second, third and fourth selection means for establishing a speed of said third and fourth variable speed motors.

19. The conveyor system in claim 18 wherein said first means is adapted to varying the speed of each said induct control conveyor between a low-speed and at least one speed that is greater than said low-speed and wherein said control means actuates said third and fourth selection means in a manner that will provide said controlled spacing between packages on each said induct control conveyor as a function of the time it takes said first means to cause each said induct control conveyor to switch from a particular speed to said low-speed.

20. The conveyor system in claim 19 wherein said control means provides said controlled spacing between the centerlines of packages on said induct control conveyors.

21. The conveyor system in claim 19 wherein said low-speed is a stopped condition.

22. The conveyor system in claim 18 wherein said first means controls said induct control conveyors to discharge packages to said sortation subsystem at a speed that is different from the line speed of said sortation subsystem and includes means for determining edge-to-edge spacing between packages merged from said induction lines as a function of the ratio of the speeds of said induction and sortation subsystems.

* * * * *

UNITED STATES PATENT AND TRADEMARK OFFICE
CERTIFICATE OF CORRECTION

PATENT NO. : 5,267,638
DATED : December 7, 1993
INVENTOR(S) : Martin R. Doane et al.

It is certified that error appears in the above-indentified patent and that said Letters Patent is hereby corrected as shown below:

Column 12, line 4;
  After "selected" insert --.--.

Column 14, line 63;
  "48d'" should be --46d'--.

Column 24, claim 10, line 52;
  "associates" should be --associated--.

Signed and Sealed this

Thirtieth Day of August, 1994

Attest:

BRUCE LEHMAN

Attesting Officer     Commissioner of Patents and Trademarks